United States Patent [19]
Johnson, Jr.

[11] Patent Number: 5,640,504
[45] Date of Patent: Jun. 17, 1997

[54] DISTRIBUTED COMPUTING NETWORK

[75] Inventor: Harold E. Johnson, Jr., Newtown, Pa.

[73] Assignee: Advanced Computer Applications, Inc., Newtown, Pa.

[21] Appl. No.: 185,625

[22] Filed: Jan. 24, 1994

[51] Int. Cl.$^6$ ............................................. G06F 11/00
[52] U.S. Cl. ............................... 395/182.02; 395/652
[58] Field of Search ........................... 395/200, 182.21, 395/182.02, 650

[56] References Cited

U.S. PATENT DOCUMENTS

| | | | |
|---|---|---|---|
| 4,323,966 | 4/1982 | Whiteside | 395/180 |
| 4,333,144 | 6/1982 | Whiteside | 395/650 |
| 4,658,351 | 4/1987 | Teng | 395/650 |
| 4,692,918 | 9/1987 | Elliott | 370/85 |
| 4,805,107 | 2/1989 | Kieckafer | 395/650 |
| 4,905,233 | 2/1990 | Cain et al. | 370/94.1 |
| 4,939,726 | 7/1990 | Flammer et al. | 370/94.1 |
| 4,951,193 | 8/1990 | Muramatsu | 395/650 |
| 4,956,841 | 9/1990 | Judeinstein et al. | 370/94.1 |
| 4,999,829 | 3/1991 | Fite, Jr. et al. | 395/182.02 |
| 5,001,702 | 3/1991 | Teraslinna et al. | 370/60 |
| 5,016,163 | 5/1991 | Jesshope e al. | 395/311 |
| 5,018,138 | 5/1991 | Twitty et al. | 370/94.1 |
| 5,020,054 | 5/1991 | May, Jr. | 370/94.1 |
| 5,020,055 | 5/1991 | May, Jr. | 370/94.1 |
| 5,048,011 | 9/1991 | Melen | 370/60 |
| 5,136,715 | 8/1992 | Hirose | 395/775 |
| 5,222,221 | 6/1993 | Houri | 395/375 |
| 5,315,587 | 5/1994 | Kullander | 370/60 |
| 5,325,529 | 6/1994 | Brown | 395/700 |
| 5,357,612 | 10/1994 | Alaiwan | 395/200 |
| 5,367,643 | 11/1994 | Chang | 395/325 |
| 5,404,550 | 4/1995 | Horst | 395/800 |
| 5,452,454 | 9/1995 | Basu | 395/700 |
| 5,465,372 | 11/1995 | Gottlieb | 395/800 |

OTHER PUBLICATIONS

Pountain, Dick. *BYTE*, "Virtual channels: The Next Generation of Transputers," (New York, NY: McGraw–Hill, Inc.), Apr. 1990.

Shumway, Martin. *Deadlock-Free Packet Networks*, (Colorado Springs, CO: Central Applications Group, INMOS) 18 Aug. 1989, pp. 1–35.

May, David and Peter Thompson. *Transputers and Routers: Components for Concurrent Machines*, Apr. 4, 1990.

*Primary Examiner*—Eric Coleman
*Attorney, Agent, or Firm*—Dann, Dorfman, Herrell and Skillman, P.C.

[57] ABSTRACT

A distributed computing network has a packet routing system for routing packets among packet lists accessible to tasks. Packets are routed and attached to lists identified within a packet header or selected from router tables. Access to packet lists is managed according to data stored within packet list headers. Several types of packets are used for exchanging data, executing remote instructions, maintaining communication between network nodes, and supplying initialization instructions to network nodes. An inductive booting mechanism uses the packet routing system to initialize nodes and to re-boot failed nodes. Interface tasks manage transmission and reception of packets between nodes in order to provide asynchronous communication between tasks in a multitasking distributed computing environment.

36 Claims, 14 Drawing Sheets

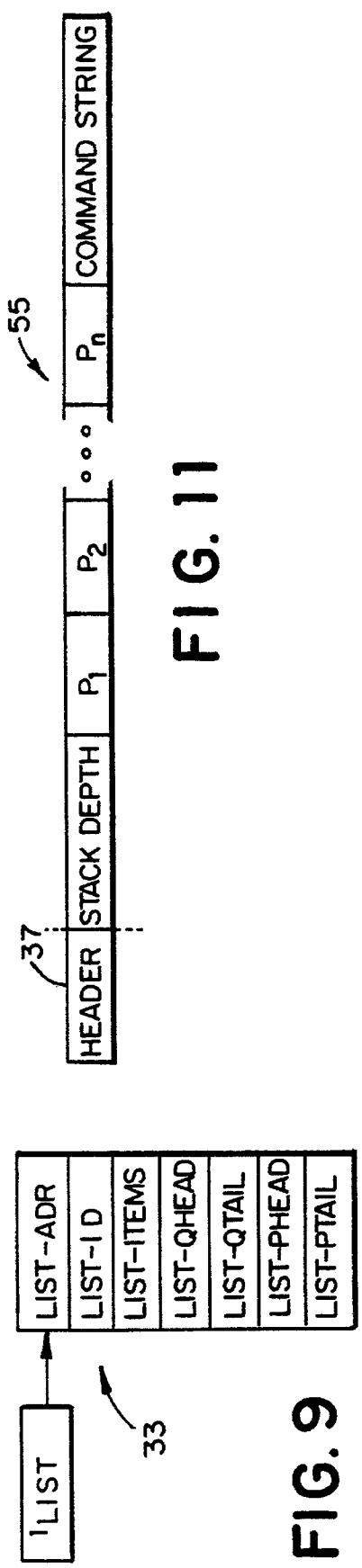
FIG. 9
FIG. 11
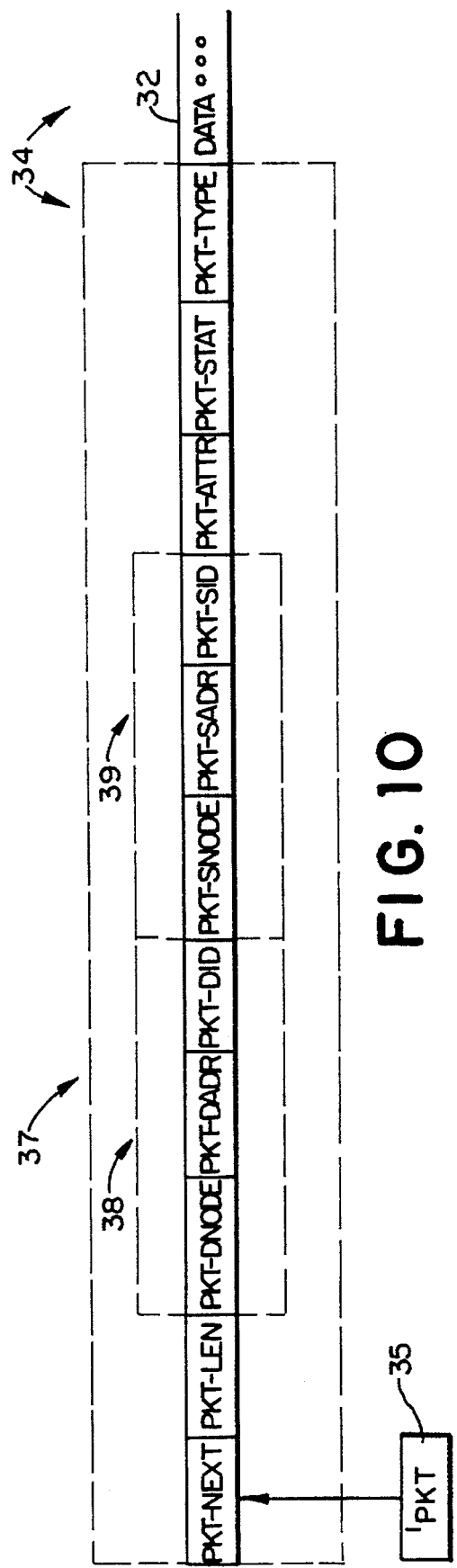
FIG. 10

DISTRIBUTED COMPUTING NETWORK

FIELD OF THE INVENTION

The present invention relates to distributed computing networks and particularly to communication of data and control signals among intelligent nodes within a network including the initialization of intelligent nodes by a method of distributed control within a flexible hierarchy.

BACKGROUND OF THE INVENTION

Distributed computing networks are conglomerations of autonomously-functioning processing units which are arranged in such a way that individual units may be assigned to perform tasks, such as programs, processes, routines, functions, or jobs, which are sub-parts of a larger process for which the network is employed. Distributed computer networks are useful for applications such as control of industrial processes wherein many different operations are performed in a number of physical locations, yet many of the operations need to be coordinated with one another. A computer network for such an application would include a number of autonomous intelligent units or nodes which are each programmed to execute particular tasks and which are connected by a web of communication links so that the nodes may share information with one another.

A type of computer chip called a transputer has been developed for use in parallel processing applications. A transputer chip includes a processor with an internal time-sharing system capable of executing more than one task, on-board memory for storing programs and data, and four bi-directional data ports. Ordinarily, communication between tasks in conventional transputer networks is accomplished via synchronous data channels between tasks. Complex switching networks may be needed to provide an adequate number of data channels. As the number of nodes in such a network increases, the complexity of the switching network increases. In order to facilitate the construction of switching networks for transputers, crossbar switching chips have been developed which can interconnect as many as thirty-two (32) bi-directional ports. Layers of router chips can be used to build switching networks of larger arbitrary sizes. Management of such large switching networks requires considerable software overhead, and tasks on each node must still contend for the use of a finite number of channels.

Another problem with traditional distributed computer networks is that, once designed and programmed, it becomes increasingly difficult to add new nodes or to reassign tasks among nodes since any tasks that may be affected or may need to communicate with tasks at the new location must be reprogrammed to account for the new network topology. Additionally, the switching network then requires reconfiguration to accommodate the new nodes.

As network size increases, the average time between node failures decreases. Hence, for networks employing a fixed routing topology, the maximum network size is determined by individual node reliability and the minimum acceptable time between failures. To improve the reliability of distributed computing networks, it would be desirable to provide a network with the ability to dynamically alter its information routing topology so that the functions assigned to failed nodes could be reassigned to other nodes without interrupting network operation. It would further be desirable to provide a network in which the nodes would have the capability of monitoring the operation of their neighboring nodes and to reboot their neighbors upon detecting a failure.

The problems associated with conventional transputer networks, such as the need for synchronous communication between tasks, the need for router chips to effect switching, and difficulties often encountered in network reconfiguration, have limited the development of flexible, adaptable, modular, intelligent networks.

SUMMARY OF THE INVENTION

According to one aspect of the present invention, communication between nodes is accomplished by the use of interface tasks for controlling the operation of each communication port of each transputer node. Each port is assigned a link-output task for transmitting information from the port and a link-input task for receiving information and storing it into the node memory or heap. Information is exchanged between lists in a structure called a packet. Packets include a header containing routing information and a body containing data or instructions.

In accordance with another aspect of the invention, a packet routing system, including a packet routing routine called ROUTE-PACKET and node-local router tables, is used to route packets of information between linked lists of packets. Tasks may access such linked lists of packets. Data structures termed packet list headers are associated with the packet lists and are used to manage access to packet lists. A packet list header includes pointers to the beginning and end of a packet list. Each packet list header may also include pointers to the beginning and end of a task queue comprising a linked list of tasks waiting to take packets from the packet list.

A task may send a packet to a node-local packet list, to a packet list on another node in a local network, or to a packet list on another node in a remote network by invoking ROUTE-PACKET. In order to send a packet on one node to a destination packet list on another node, a sending task upon one node constructs or otherwise obtains a packet in the heap containing the information to be sent. Then, the sending task invokes ROUTE-PACKET, which consults a router table in order to obtain the address of a packet list header pertaining to an intermediate packet list to which the packet is to be attached. Such an intermediate packet list may be associated with a link-output task. The link-output task then can obtain the packet from the intermediate packet list and transmit the packet across a physical link toward the destination node of the packet.

Link-input tasks provide the function of receiving packets from physical links, storing them in the heap, and invoking ROUTE-PACKET to attach incoming packets to either a destination packet list on the node or to yet another intermediate packet list for transmission to another node. Rather than incurring the time losses involved in synchronous intertask communication, tasks within systems send and receive messages by performing operations upon packet lists in the heap at any time without regard for the details of routing or port availability. Packets may likewise be routed among packet lists associated with interface tasks which govern the operation of non-transputer interfaces, as may be used to interconnect nodes of a network or to serve as gateways to networks having disparate data communication protocols.

A packet is routed to a destination packet list on a predetermined node by altering one or more pointers within the associated packet list header. ROUTE-PACKET attaches packets to their destination lists, to intermediate lists such as link-output task lists, or to a designated task list for error handling. In most cases, ROUTE-PACKET receives the heap address of a packet and attaches the packet to a packet list. ROUTE-PACKET may discard certain packets that have encountered routing or delivery errors. When a packet is to be sent to a packet list upon another node, ROUTE-PACKET uses a router table to select an intermediate packet list to which to attach the packet. The router table contains information associating other nodes of the network with one or more packet lists. For packets that are to be transmitted via a network link, the router table is used by ROUTE-PACKET to determine the address of a packet list header, such as may indicate a packet list serviced by an appropriate link-output task for sending a packet across a link to an adjacent node toward the destination of the packet. The router table on the next node contains routing data for the next step, if any, so that a packet ultimately reaches its destination by skipping from node to node. Each packet contains a header which provides information to ROUTE-PACKET indicating the location of the destination packet list. In cases wherein a packet is destined for a packet list on the immediate node, ROUTE-PACKET links the packet directly into the destination packet list without requiring the use of the router table or an intermediate packet list. Such direct attachment to the destination packet list is performed without changing the location of the packet in the heap.

According to a further aspect of the invention, packets propagate in a store-and-forward fashion determined by the routing system according to the router tables resident upon each node. Hence the distributed computer network behaves as its own routing network. The node-specific router tables can be distributed to the nodes from a central library of router tables. The router tables can be altered during the course of operation of the network as circumstances may require without disrupting operation of the network.

Networks constructed according to yet another aspect of the invention possess an inductive booting mechanism whereby nodes are reset and initialized by adjacent nodes in a cascaded fashion. A node or group of nodes execute specialized file access tasks, designated librarian tasks, which include the function of maintaining initialization codes, router tables, and other information relevant to node initialization. The link-output task for each port of a node includes a provision for monitoring the status of the adjacent node and causing the librarian to be notified if the adjacent node has failed or otherwise requires initialization. In such circumstances, the librarian can then issue a specialized packet, called a boot packet, which contains the required initialization information. The link-output task then activates a reset line connected to the adjacent node and downloads information from the boot packet in order to initialize the failed or inoperative node. In this manner, an entire network, or selected nodes therein, can be re-booted or reprogrammed.

BRIEF DESCRIPTION OF THE DRAWINGS

The foregoing summary, as well as the following detailed description of the preferred embodiments of the present invention, will be better understood when read in conjunction with the appended drawings, in which:

FIG. 9 is a memory map of a packet list header;

FIG. 10 is a block diagram of a packet structure;

FIG. 11 is a block diagram of an interpreter packet structure;

DETAILED DESCRIPTION OF THE PREFERRED EMBODIMENTS

Figure 1:
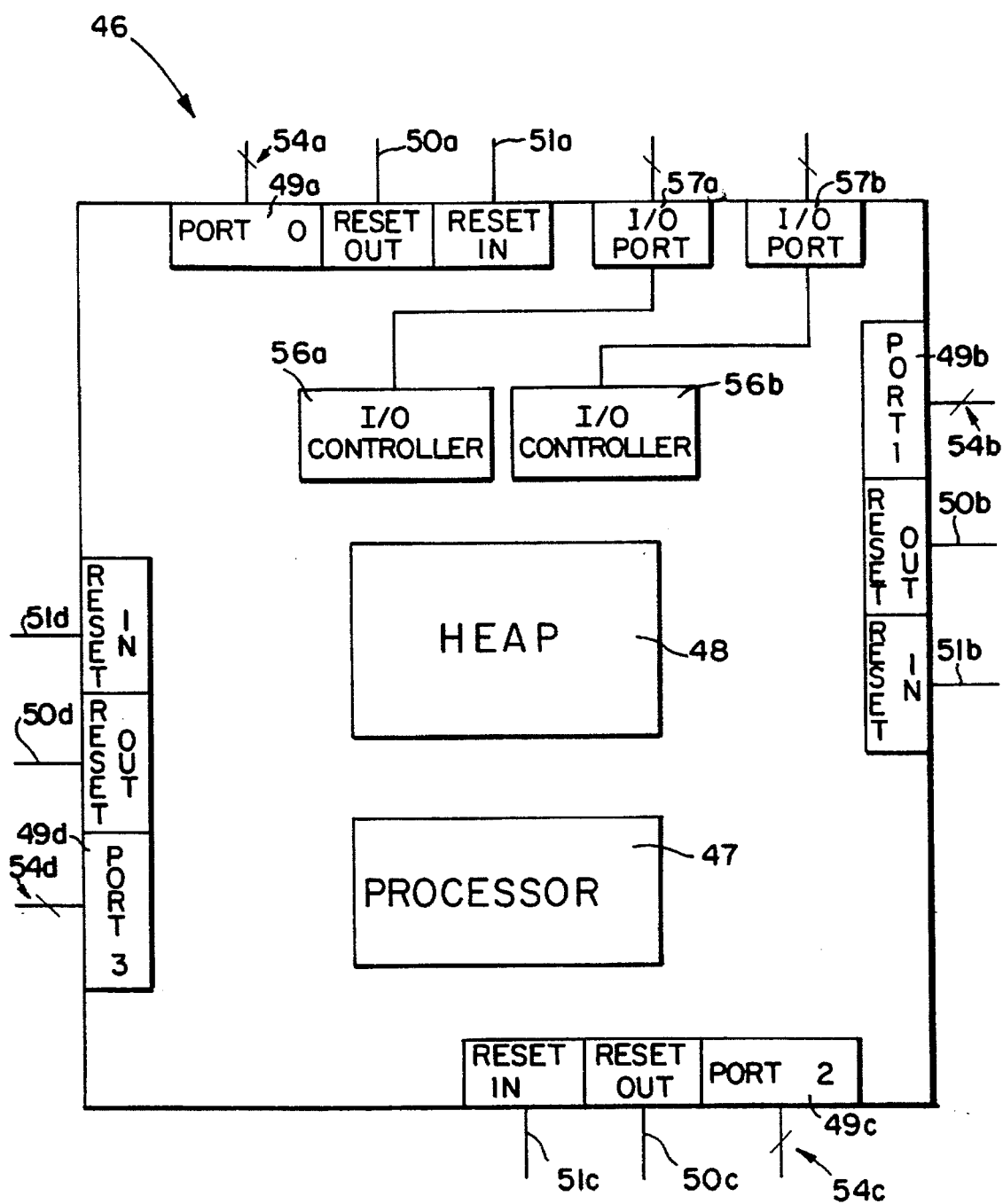
FIG. 1 is a schematic representation of a node employed in t practice of the invention.

An intelligent node 46 for a distributed computing network is shown in FIG. 1. The node 46 includes a processor 47; heap memory 48, four bi-directional data ports 49a–d designated as port 0, port 1, port 2, and port 3; four reset-out lines 50a–d; and four reset-in lines 51a–d. The node 46 may include a transputer, such as a transputer of the T400 or T800 variety manufactured by Inmos Ltd. of the United Kingdom. The node 46 may also include supplemental off-chip random access memory for providing supplemental heap memory. Other types of I/O controllers, such as controllers 56a,b may be provided to allow communication via I/O ports 57a,b in order to interface with various computing hardware using such protocols as SCSI, Ethernet, RS-232, etc. It is to be understood that the node 46 may be a monolithic device or may be implemented using various individual components interconnected to provide memory, processing, and communication capabilities. The functional capacities of a node as defined herein may be provided, for example, by a personal computer equipped with an appropriate communication interface.

The processor 47 is a multi-tasking processor which executes tasks, such as programs, processes, routines, functions, or jobs, assigned to the node 46. The operation of the node 46 is generally managed by a kernel task. The heap 48 is a memory which stores local variables and instructions comprising each task and includes allocated space for each task's requirements such as task variables, lists, and stacks and space for packets of information.

The reset-out lines 50a–d are lines that carry signals to the reset-in lines 5a–d of the respective nodes to which associated data links 54a–d are connected. Any node to which the data links 54a–d of a predetermined node are directly connected shall be referred to as an adjacent node of the predetermined node regardless of the physical location of such a node relative to the predetermined node.

The transputer node 46 includes reset-in lines 51a–d which cause the node 46 to reset when a reset signal is received at any of the reset-in lines 51a–d. The reset-in lines 51a–d are connected to respective reset-out lines of adjacent nodes, if any, so that each node has the ability to cause an adjacent node to reset. Assertion of any of the reset-in lines 51a–d will cause resetting of the node 46. After being reset, the node 46 is then ready to be booted for operation. Such reset capability may be implemented in alternative embodiments by, for example, providing a single reset-in line which is connected to the output of a multi-input logical OR gate. In such an embodiment, the inputs to the OR gate provide multi-line reset-in capability. It is also noted that more than one network node may be responsive to a single reset line in order to provide the ability to reset and boot several such nodes simultaneously.

Booting, or boot-strapping, is a process in which a computing device, such as the node 46, loads its initial instructions or code to begin operation. The node 46 may load its initial set of instructions via any of the four data ports 49a–d or from an onboard non-volatile memory such as a ROM.

The data ports 49a–d, the processor 47, the heap 48, and the optional I/O controllers 56a,b are cooperatively interconnected to provide the node with processing, memory, and communication capabilities.

Information is exchanged within a network of nodes by routing packets to linked lists of packets. Packets are formatted data structures having a header and a body. The packet header contains information pertaining to routing and to other information about the packet. The packet body is an arbitrarily long field containing data or instructions. A packet routing system, including a packet routing routine called ROUTE-PACKET and router tables, is provided to selectively attach packets of information to packet lists. Such packet lists are referred to herein as (i) destination lists when the packet list is the intended recipient of the packet as indicated by information in the packet list header or (ii) intermediate lists when the packet list is not the intended recipient of the packet, but the packet list serviced by a task which transmits packets toward a particular destination or set of destinations.

Each transputer node 46 maintains interface tasks such as link-output tasks for sending packets via the ports 49a–d. Link-input tasks are also provided for receiving packets through ports 49a–d. Each one of the ports 49a–d is assigned a link-output task for controlling the transmission of packets from the node across the corresponding link. Likewise, each port 49a–d of the node is also assigned a link-input task which performs the function of receiving packets and storing packets in the heap 48. The link-output and link-input tasks facilitate inter-node transmission of packets. Other I/O controllers, such as I/O controllers 56a and 56b, as may be connected with the internal bus of a node are managed by specialized interface tasks which may transmit and receive packets as well as to encapsulate and to decapsulate packets to provide compatibility with various hardware and software communication protocols.

As part of the packet routing system, tasks can access packet lists by using packet list headers, which provide information for locating packets on packet lists. A packet list header includes pointers to the beginning and to the end of its associated packet list. To effect a transfer of a packet between packet lists on different nodes connected by transputer links, a task upon one node constructs in the heap a packet containing the information to be sent. Then the sending task invokes ROUTE-PACKET which links the packet into a selected intermediate packet list that is serviced by a link-output task. The selected packet list may alternatively be associated with another task, such as an interface task, if packets bound for the specified destination node are to be handled by such an interface task. Whenever ROUTE-PACKET is invoked to handle a packet bound for a node other than the current node, the intermediate packet list is selected according to destination packet list information in the packet header and an entry of a router table resident upon the current node. If the selected intermediate packet list is associated with a link-output task, the link-output task will, in the course of its operation, remove the packet from the packet list and then transmit the packet across a link to an adjacent node.

On the other side of the link, a link-input task will receive the packet, store the packet in the heap of its node, and then invoke ROUTE-PACKET. ROUTE-PACKET may attach the incoming packet to the destination list of the packet indicated within the header of the packet. If the destination list of the packet is located on yet another node, ROUTE-PACKET will attach the packet to yet another intermediate list selected from a router table entry corresponding to the destination node of the packet. Such an intermediate list may be, for example, another packet list serviced by a link-output task. Upon eventual arrival at the destination node, the packet is attached by ROUTE-PACKET to the destination list indicated in the packet header. Rather than incurring such time losses as are customary in synchronous intertask communication, tasks within systems send and receive messages by performing operations upon packet lists in the heap at any time without regard for the details of routing or port availability.

Routing a packet to a destination packet list on a predetermined node is accomplished by manipulating pointers in the associated packet list header and by manipulating pointers within the incoming packet and the other packets on the list, if any, in order to link the packets into the destination packet lists. Each packet contains a packet header which provides information to ROUTE-PACKET to indicate the node and address of the destination packet list header associated with the destination packet list. In cases where a packet is to be attached to a destination packet list on the immediate node, ROUTE-PACKET attaches the packet directly to the destination packet list without changing the heap location of the packet and without the intervention of an intermediate packet list. Selection of an intermediate packet list by ROUTE-PACKET for effecting transmission of a packet toward a destination list on another node is facilitated by a router table which contains information associating various network nodes with particular intermediate lists on the sending node. The router table on the next node contains routing information for the next step, and so forth, so that a packet ultimately reaches its destination by skipping from node to node.

For packets which are to be sent through transputer channels to an adjacent node which is linked by a transputer link, transmission is effected by attachment to an intermediate list that is serviced by a link-output task. Packets which are to be sent to nodes accessible via other types of network links, for example an ethernet, are attached to intermediate lists serviced by specialized interface tasks, such as an ethernet encapsulator, which encapsulates and translates the packet into a suitable form depending upon the nature of the network to which the task interfaces. A router table contains at least sufficient information for selecting a packet list to which a packet is to be attached whenever the packet is addressed to a valid node number that does not match the current node.

Tasks within a network may access linked lists of packets, if any, waiting to be processed. Each such list of packets is associated with a packet list header which provides information for managing access to the packet list. A task variable 'PKT is used to point to the heap address of the current packet of interest for a predetermined task. Another task variable, 'LIST, is used to point to the packet list header associated with the packet list currently of interest to the task. In order to determine whether any packets are attached to a packet list, a task may invoke a routine called GET-PACKET to set 'PKT to the address of the first packet on the list indicated by 'LIST and to adjust the packet list header accordingly to remove the packet from the list.

GET-PACKET will cause a task to sleep, or to be taken off of the processor's active process queue, if there are no packets on the packet list. When the task has been de-activated, the task is placed upon a queue of inactive tasks waiting to remove packets from the packet list. Pointers to the beginning and to the end of the inactive task queues are maintained by the packet list header. Re-activation of an inactive task may be effected in one of two ways. GET-PACKET may be invoked with or without a parameter specifying a timeout interval. When the packet removal routine is invoked without a timeout interval, hereinafter referred to simply as GET-PACKET, the invoking task will remain inactive until a packet arrives on the selected list. When GET-PACKET is invoked with a specified timeout interval, hereinafter referred to as GET-PACKET.TN, the invoking task is placed onto the inactive process queue for a finite timeout interval of N milliseconds if there are no packets on the packet list serviced by the invoking task. Reactivation of the task may be caused by either the passage of the timeout interval or by the arrival of a packet on the packet list. The condition causing the invoking task to return to the active process queue may be determined according to a task-local flag which is set when the invoking task is re-activated.

A basic operation of a link-output task, for example, is to invoke GET-PACKET.TN to obtain a packet from its packet list and then to transmit that packet to an adjacent node. When a link-output task calls GET-PACKET.TN and reaches timeout without detecting the presence of a packet on the packet list, the link-output task will then transmit a specialized packet termed an idle packet in order to ascertain the status of the communication link. As described more fully hereinafter, such transmission of idle packets by link-output tasks upon timeout of GET-PACKET.TN is a key feature by which integrity of the network may be maintained.

The packet list header associated with each packet list includes pointers to a linked queue of tasks, if any, which have been inactivated by GET-PACKET or GET-PACKET.TN in the course of attempting to obtain a packet from an empty packet list. When ROUTE-PACKET attaches a packet to a packet list, the first task on the inactive task queue is re-activated and the packet list header is adjusted in order to advance other waiting tasks, if any, forward in the inactive task queue.

Route-Packet and Router Tables

The packet routing system includes the routine called ROUTE-PACKET for linking packets to packet lists. The packet routing system further employs data structures called router tables which ROUTE-PACKET uses to select lists to which to attach packets that are destined for other nodes. A router table contains the addresses of packet list headers that are associated with packet lists serviced by, for example, link-output tasks, specialized interface I/O controller tasks, or tasks corresponding to virtual nodes.

Figure 2:
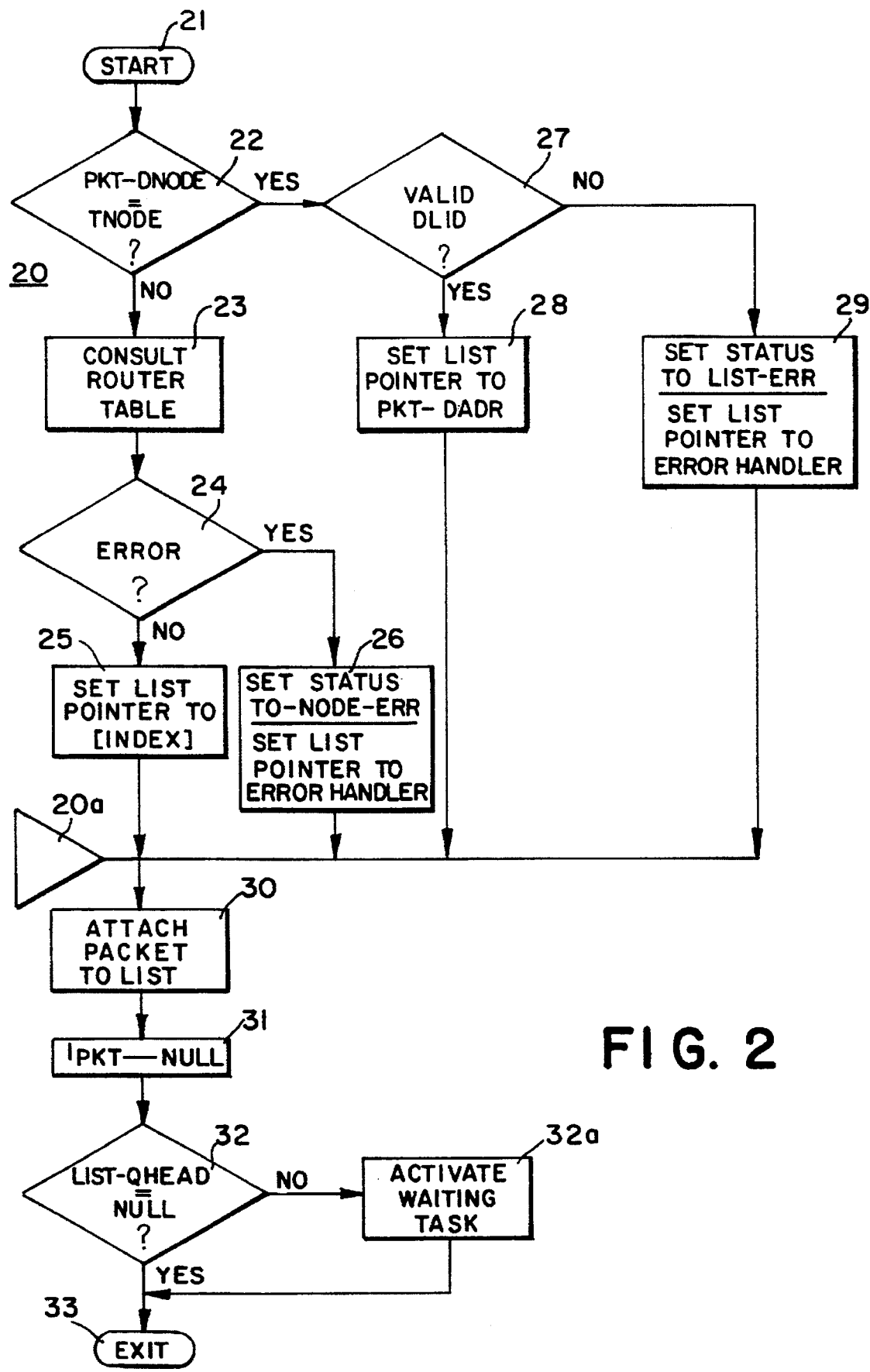
FIG. 2 is a logical flowchart of a packet routing procedure.

When a predetermined task constructs or otherwise obtains a packet that is to be sent to another task, the predetermined task invokes ROUTE-PACKET. A general flowchart of the procedure followed by ROUTE-PACKET is shown in FIG. 2. ROUTE-PACKET 20 provides the function of attaching the current packet of a predetermined task to a packet list on the same node. ROUTE-PACKET preferably accomplishes this function by re-arranging pointers within packet list headers and within packets rather than actually changing the location of packets within the heap. Pointers and other information within packet list headers and within packet headers are adjusted as needed in order to attach packets to packet lists. In instances where the current packet of a predetermined task is destined for a packet list on another node, ROUTE-PACKET uses information encoded within a router table to determine the specific node-local intermediate packet list to which to attach the current packet. Usually, ROUTE-PACKET will determine an appropriate value for a list pointer indicating the address of a packet list header associated with a packet list to which to attach the current packet.

Upon being invoked in step 21, ROUTE-PACKET 20 examines the packet header in step 22. Among the information encoded within the header of a packet is a value designated PKT-DNODE which indicates the node number of the destination node. In step 22, ROUTE-PACKET 20 compares PKT-DNODE to a node-local variable TNODE, which indicates the node number of the current node. If the current node is the destination node found in the packet header such that PKT–DNODE=TNODE, ROUTE-PACKET then, in step 27, proceeds to validate a destination list identification (DLID) also contained in the packet header. The DLID includes the node number, the packet list header address, and an identifying code pertaining to the destination packet list.

If an invalid DLID is discovered in step 27, ROUTE-PACKET 20 executes an error-handling routine in step 29. The error-handling routine of step 29 sets a status field within the packet header to indicate that a list validation error has occurred. Then, a list pointer is set to the address of a packet list header associated with a packet list that is serviced by a predetermined error handling task, such as the kernel task of the node. Alternatively, ROUTE-PACKET may determine whether the packet contains an indication that the packet is to be returned to the sending task if a delivery error is encountered. If so, ROUTE-PACKET may then route the packet to the sending task. If such a return request is not indicated by the packet, or if the packet contains an indication that the packet had incurred a previous delivery error, ROUTE-PACKET may discard the packet and exit. Otherwise, in step 30, the packet will be attached to a packet list of the predetermined error handling task.

If a valid DLID is found in step 27, control passes to step 28. In step 28, the list pointer is set to the destination packet list header address and the packet is subsequently attached to the associated destination packet list in step 30.

Packets are routed by ROUTE-PACKET 20 to packet lists other than the destination packet list indicated in the packet header when, in step 22, the destination node is found to have a different value than the current node, i.e. PKT-DNODE≠TNODE. In that instance, control passes from step 22 to step 23 wherein ROUTE-PACKET consults the router table in order to determine the location of an intermediate packet list header associated with an intermediate packet list which is designated to accept packets destined for the specified PKT-DNODE. Such an intermediate packet list may, for example, be serviced by a specialized interface task or one of the link-output tasks of the sending node governing the port of the sending node through which the packet is to be transmitted toward the destination node of the packet.

If an error is encountered during consultation of the router table in step 23, such as failure to find a packet list for PKT-DNODE, then step 24 directs control to step 26 wherein a packet status field is set to indicate a node number error. Then, the list pointer is set to the address of a packet list header associated with a packet list serviced by the kernel task or other designated error handling task. The packet is then attached to the indicated packet list in step 30.

If no error is found during consultation of the router table in step 23, then ROUTE-PACKET proceeds through step 24 to step 25 wherein the list pointer is set to the contents of an index field obtained during router table consultation in step 23. The index pointer indicates the router table entry containing the address of the packet list header of the intermediate packet list to which the packet is to be attached. ROUTE-PACKET 20 then proceeds to step 30.

In step 30, ROUTE-PACKET 20 attaches the current packet of the invoking task to a packet list indicated by the list pointer that was set during any of the procedures leading to step 30. Additionally, ROUTE-PACKET may discard packets containing an erroneous or invalid DLID and then exit prior to reaching step 30, as discussed previously herein.

In step 30, the packet may be attached to the packet list of the kernel task in case an error is encountered by ROUTE-PACKET 20 during its execution. The packet may be attached to a destination list if the destination list and the invoking task are on the same node. Finally, the packet may be attached to an intermediate list determined by the router table if the packet is addressed to a destination list resident upon a node that is different from the invoking task's node. Then, in step 3, the packet is removed from the invoking task by setting the value of 'PKT of the invoking task to NULL since the packet has been placed upon another list and is no longer associated with the invoking task.

ROUTE-PACKET then proceeds to step 32 wherein ROUTE-PACKET consults the packet list header fields pertaining to the queue of inactive tasks, if any, that may be waiting to take packets from the packet list to which the packet had been attached in step 30. If there are no such inactive tasks, then ROUTE-PACKET proceeds to step 33 and exits. If, in step 32, there are any inactive tasks on the queue, then an inactive task is re-activated in step 32a. Inactive tasks in transputer-based systems may be reactivated via an alternative input channel of the inactive task. Other task activation mechanisms, such as task-local registers for indicating active status may be employed. When an inactive task is reactivated, a flag local to that task is set to indicate the condition, or alternative input channel, which led to its reactivation. Preferably, tasks are taken off of the inactive queue on a first-in/first-out basis although other queuing protocols may be implemented. ROUTE-PACKET 20 then proceeds to step 33 and exits.

Figure 6:
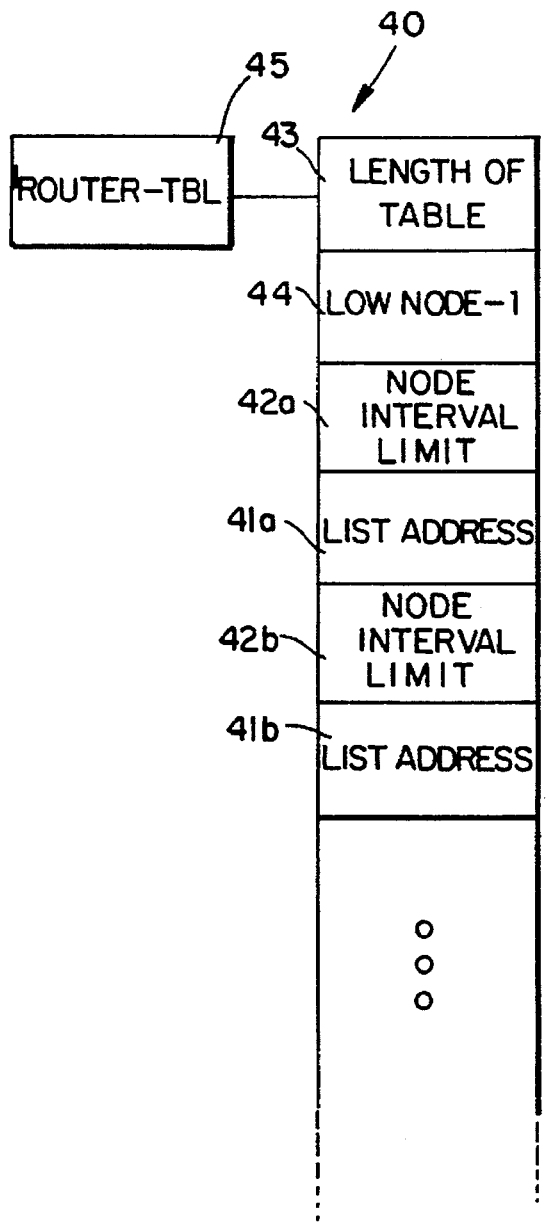
FIG. 6 is a memory map of a router table used by the packet routing procedure of FIG. 2.

The structure of a router table 40 is illustrated in FIG. 6. Only a portion of a router table is shown for purposes of illustration since a router table may be arbitrarily large depending upon the number of nodes in the network and the network topology. The router table is a list of pairs of destination node interval limits and pointers to packet list headers of intermediate packet lists to which packets addressed to nodes within the intervals are to be attached. The router table for a given node is stored in the heap at an address indicated by a node-local variable, 'ROUTER-TBL 45. The first entry 43 in the router table 40 contains the number of interval/list pairs in the table. The second entry 44 is a number corresponding to the lowest node number in the network. Entries 41a and 41b in the table identify packet list header addresses. Entries 42a and 42b identify the limits of destination node number intervals consecutive to the previous destination node number interval entry in the table. The table thereby provides packet list header addresses which correspond to intervals of node numbers.

For example, entry 42a is used in conjunction with entry 44 to define a range, inclusive with the contents of entry 44, of destination node numbers for which packets will be attached to a packet list indicated by entry 4a. The contents of entry 4a include the address of a packet list header associated with the indicated intermediate packet list. Such a packet list could be, for example, a packet list serviced by a link-output task. Similarly, entry 42b is used in conjunction with entry 42a to define another range, exclusive of the contents of entry 42a, of node numbers for which packets will be attached to a packet list associated with a packet list header address stored in entry 41b. Different intervals of node numbers may be assigned to the same packet list. All of the nodes in the network, except for the node on which the specific router table is resident, may be identified on the router table so that each node is assigned a packet list to which ROUTE-PACKET will attach packets destined for that node.

Because ROUTE-PACKET does not consult the router table in order to route packets destined for packet lists on the local node, there is no router table entry needed for the node upon which the table is resident. For intra-node packet communication, ROUTE-PACKET attaches a packet directly to the destination packet list rather than by attaching the packet to an intermediate packet list selected from the router table. Such intra-node transfer of packets is accomplished by adjusting pointers within the packet list headers of the affected packet lists and within the affected packet headers rather than by actually changing the location of the packets in the heap.

The heap address of the router table 40 is known to ROUTE-PACKET via a pointer variable 'ROUTER-TBL 45. An alternate router table may be used by constructing a table using appropriate routines and then setting 'ROUTER-TBL to point to the newly-constructed table. The original router table may be restored if the previous pointer value was saved prior to being reassigned.

Transputer Network

Figure 8:
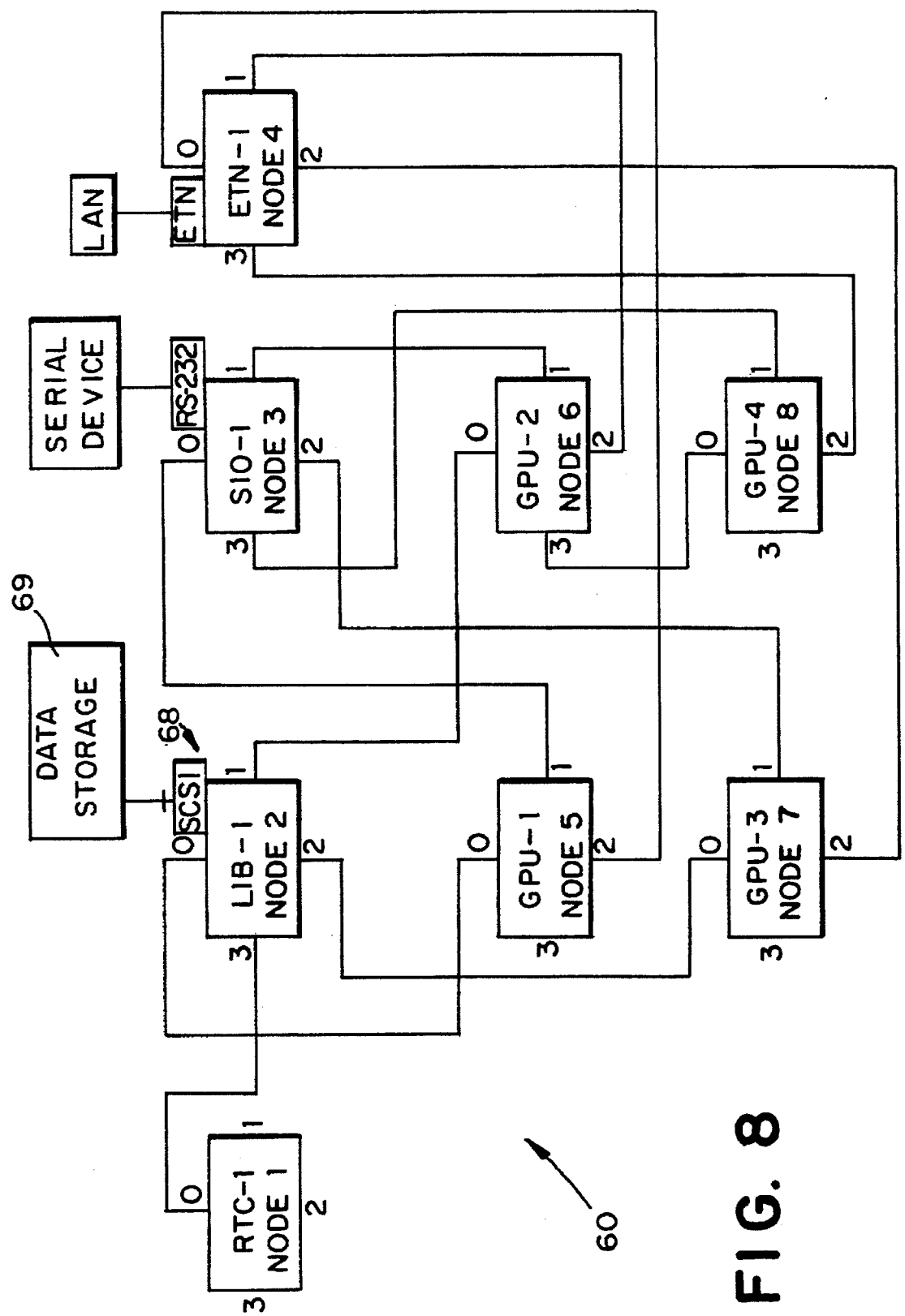
FIG. 8 is a functional block diagram of a network of transputer nodes.
Figure 12:
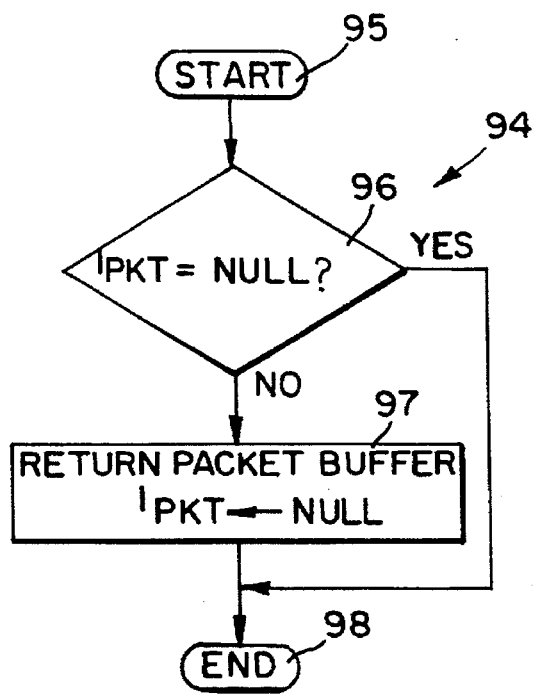
FIG. 12 is a logical flowchart of a procedure used by tasks to discard packets.
Figure 13:
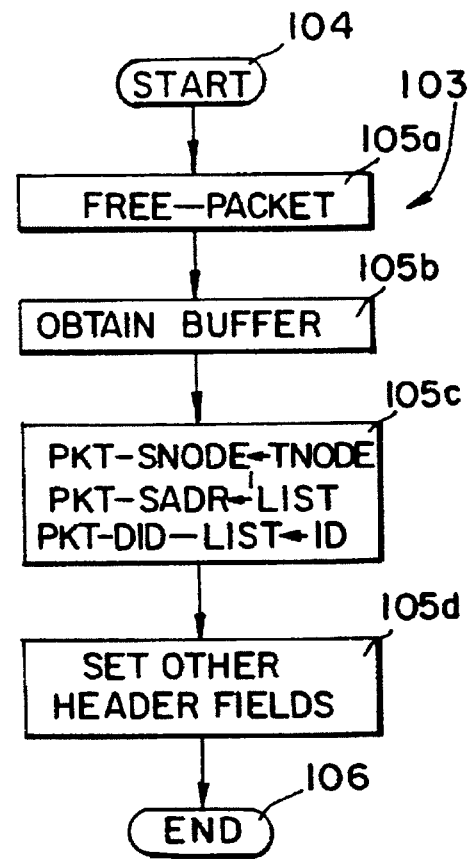
FIG. 13 is a logical flowchart of a procedure used by tasks to construct packets.

Referring to FIG. 8, a transputer network 60 comprising eight transputer nodes designated Nodes 1–8 is depicted. The transputer-based network typically includes nodes that have specialized functions and interfaces in addition to general processing resources.

The node LIB-1, Node 2, includes a non-transputer interface 68 to a data storage subsystem 69. Tasks that perform special file-serving functions to mass-storage subsystems such as that connected to Node 2 are designated librarian tasks. Access to the data storage subsystem 69 is governed by a specialized interface task resident upon Node 2. Node RTC-1, Node 1, contains a real-time clock and coordinates functions related to time keeping and system initialization. Nodes GPU-1 through GPU-4, Nodes 5–8, are high performance general processing units. Node SIO-1, Node 3, features serial input/output interfaces for peripheral devices such as terminals, modems, and/or printers. Node ETN-01, Node 4, provides an interface to an ethernet LAN.

Routing a Packet

Figure 7:
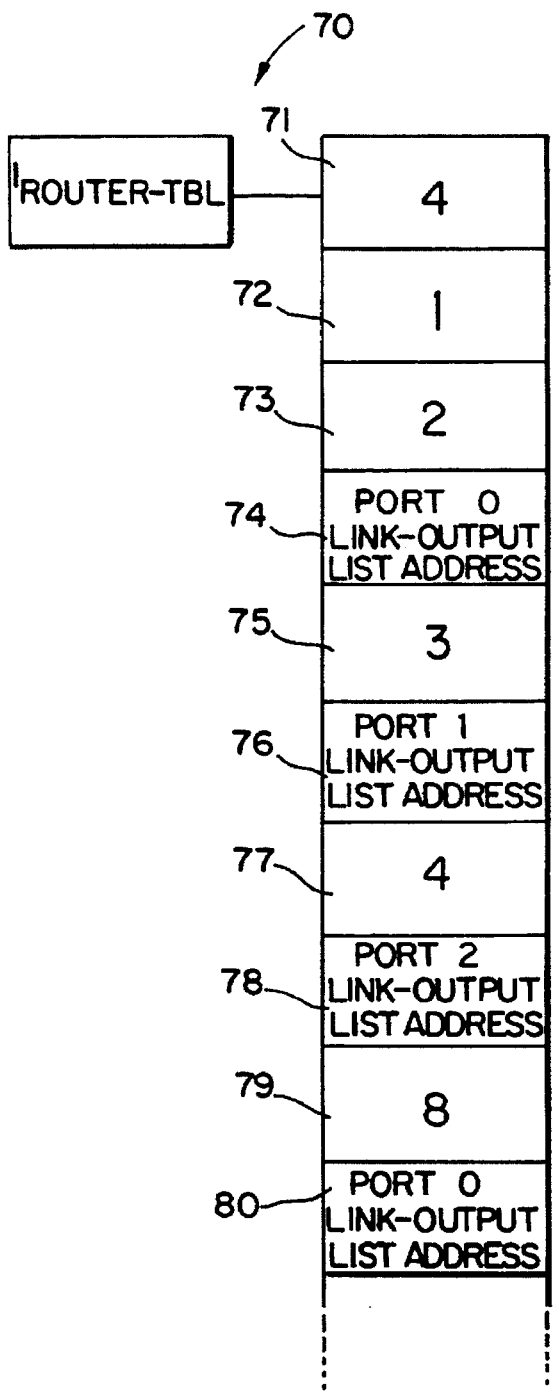
FIG. 7 is a memory map of a router table specific to a selected node of a network.

Consider a packet to be sent from a task on Node 5 to a task on Node 6 of the transputer network 60. Upon the invocation of ROUTE-PACKET by the sending task on Node 5, the variable PKT-DNODE in the packet header, which indicates the destination node of the packet, would be equal to six. The local node number, TNODE, would be equal to five. Therefore, ROUTE-PACKET 20 will proceed through the negative branch of step 22 shown in FIG. 2 to reach step 23 wherein the router table for Node 5 will be consulted. The router table 70 for Node 5 of the network 60 is shown in FIG. 7.

It can be seen from FIG. 8 that there is no direct connection between Nodes 5 and 6. Therefore, the packet must be routed from Node 5 to some other node for eventual delivery to Node 6. Since Node 6 falls into the interval between 4 and 8 as defined by entries 77 and 79 of the router table 70, packets on Node 5 which are destined for Node 6 will be attached to the packet list for the link-output task of Node 5 governing port 0 of Node 5 as indicated by entry 80 of the router table 70. As shown in FIG. 8, the link corresponding to port 0 of Node 5 connects to port 0 of Node 2. Hence a packet from Node 5 destined for Node 6 will be temporarily stored within the heap of Node 2 and then may be transmitted through port 1 of Node 2 through the link to port 0 of Node 6.

Figure 3:
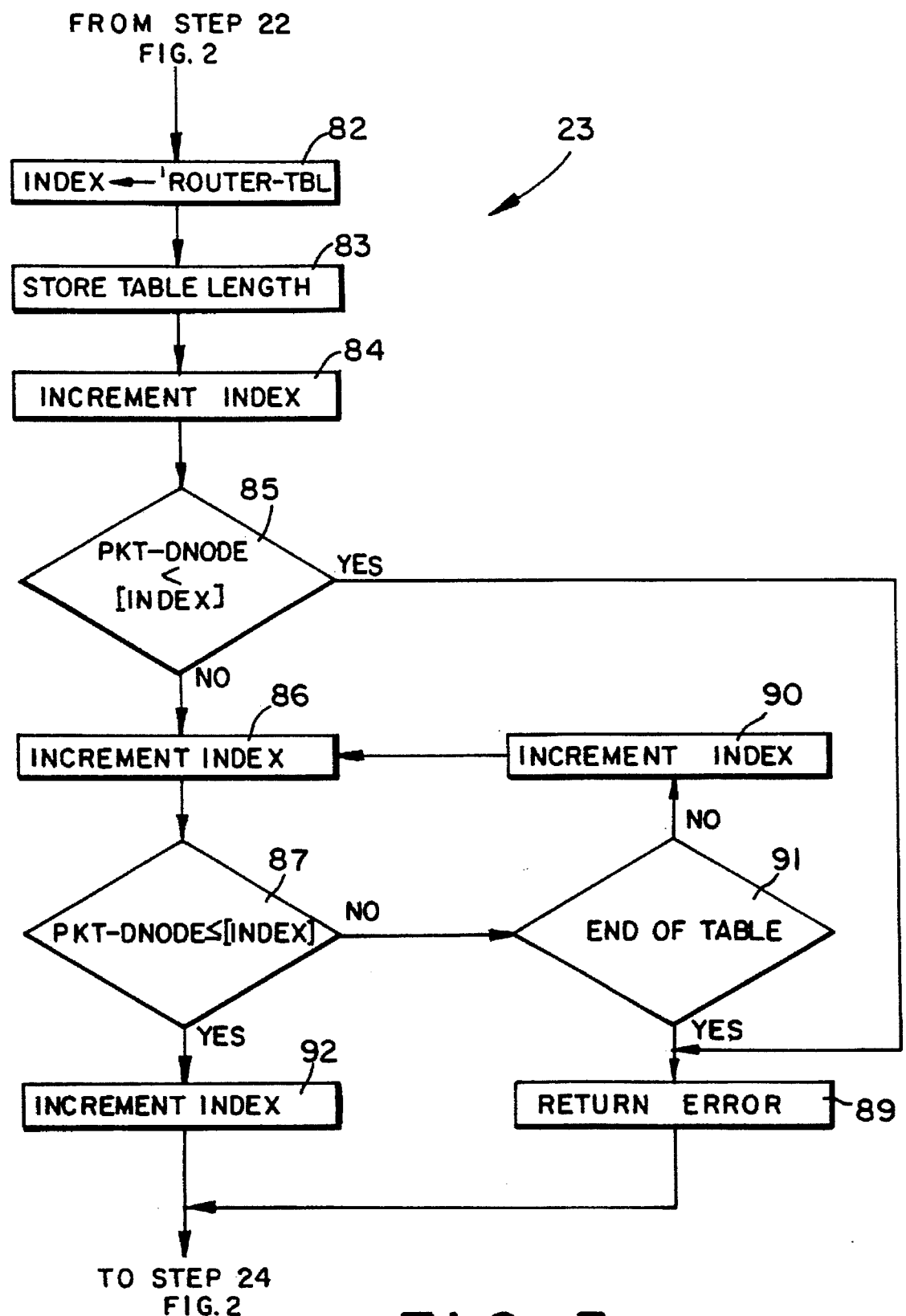
FIG. 3 is a logical flowchart detailing one of the procedural sp of the packet routing procedure of FIG. 2 in which a router table is consulted.

A representative flow-chart outlining the function of step 23 in FIG. 2 by which ROUTE-PACKET 20 consults the router table of Node 5 is shown in FIG. 3. Upon entry from step 22, the variable 'ROUTER-TBL is stored, in step 82, for use as an index pointer. As shown in FIG. 7, the node variable 'ROUTER-TBL points to the first entry 7 of the router table 70 for Node 5. The first entry 71 contains the value 4 which indicates the number of node-interval pairs within the router table 70, i.e., entries 73–74, 75–76, 77–78, and 79–80. Referring again to FIG. 3, the first entry 71 of the router table 70 for Node 5 is stored in step 83 by ROUTE-PACKET 20 in order to control the number of times a test loop is executed. The index pointer provided by the contents of the location indicated by 'ROUTER-TBL is incremented in step 84 and then points to the second entry 72 of the router table 70 for Node 5. A test is made in decision step 85 in order to determine whether the value of PKT-DNODE is less than the lowest node number indicated by the contents of entry 72. Since, in this example, PKT-DNODE equals 6 and the contents of entry 72 equals 1, then PKT-DNODE is not less than the contents of entry 72 so decision step 85 passes control to step 86. Had the test in decision step 85 not failed, control would have passed to a node number error routine in step 89 to return an error indication used in error detection step 24 that an error relating to node numbers had been encountered.

In step 86, the index pointer is incremented to point to entry 73 of the router table 70 for Node 5. The value contained in entry 73 defines the first node interval limit of the router table 70. A test is then made in step 87 to determine whether PKT-DNODE is less than or equal to the contents of entry 73. Since entry 73 contains the number 2 and PKT-DNODE is equal to 6, control passes to step 91.

Proceeding to step 91, the initially-stored table length is compared to the number of times step 87 has been executed. If the end of the table had been reached, control would have passed to a node number error routine, step 89. In this example, since the end of the table has not been reached, control passes from step 91 to step 90 wherein the index pointer positioned at table entry 73 is incremented. The index pointer is then incremented again at step to point to the next node number interval limit at entry 75.

ROUTE-PACKET then loops through steps 87, 91, 90, and 86 two more times, incrementing the index pointer until entry 79 of the router table 70 for Node 5 is indicated. At that time, PKT-DNODE which is equal to six, falls within the interval defined by entries 77 and 79, i.e. Nodes 6,7, and 8. Node 5 is not included in the interval because if PKT-DNODE had been equal to 5, ROUTE-PACKET would have branched to step 27 at step 22 thereby avoiding use of the router table. Since PKT-DNODE ≦8, the test at step 87 passes control to step 92 wherein the index pointer is incremented to point to entry 80 of the router table 70. The value contained within entry 80 is the address of a packet list header accessible to the link-output task governing port 0 of Node 5. ROUTE-PACKET then proceeds, as shown in FIG. 2, to step 25 in which the list pointer is set to the value found during consultation of the router table, i.e. the contents of entry 80 pointed to by the index pointer. Then, during step 30, the packet is attached to the packet list associated with the packet list header indicated by the list pointer, in this case a packet list serviced by the link-output task governing port 0 of Node 5.

After a packet is attached to a packet list in step 30, ROUTE-PACKET proceeds to step 3 and then to step 32 to activate any inactive task which may be waiting in GET-PACKET for a packet to arrive on the list. The link-output task governing port 0 of Node 5 may subsequently obtain the packet from the packet list and then transmit the packet from port 0 of Node 5, across the link to Node 2, and to the link-input task of port 0 on Node 2. A router table on Node 2 may then cause the packet to be routed to a packet list serviced by the link-output task of port 1 of Node 2 for transmission of the packet to port 0 of Node 6. Alternative embodiments of the router table consulting routine 23 may be implemented to achieve the same overall result.

The router table 70 for Node 5 may further contain entries for node numbers other than those in network 60. For example, packets destined for packet lists on nodes located in another network, accessible via an ethernet interface resident upon Node 4, could be routed to Node 4 from other nodes in the network 60. Router tables would include the node interval limits for the nodes in the other network. Such node interval limits may be associated by the router table with one or more packet lists that are serviced by encapsulation and transmission tasks for transmitting packets to nodes within the other network.

Packet Lists and the Packet List Header

The format of a packet list header 36 is shown in FIG. 9. The packet list header provides pointers to a packet list. Uses of the packet list header 36 include (i) allowing GET-PACKET or GET-PACKET.TN to find and remove packets from a packet list, (ii) allowing GET-PACKET or GET-PACKET.TN to place the invoking task on a queue of tasks waiting to service packets on the packet list and (iii) enabling ROUTE-PACKET to attach packets to a packet list and to find inactive tasks waiting for packets to arrive on the packet list.

The packet list header 36 includes the fields LIST-ADR, LIST-ID, LIST-ITEMS, LIST-QHEAD, LIST-QTAIL, LIST-PHEAD, LIST-PTAIL as shown in FIG. 9. A task variable, 'LIST, is maintained by each task as a pointer to the first field of a packet list header.

The first field of the packet list header 36, LIST-ADR, contains the value of its own address and hence contains the value of 'LIST maintained by any tasks servicing the associated packet list. LIST-ADR is used by ROUTE-PACKET to verify that a destination packet list header indicated within an incoming packet header corresponds to the address of a packet list header and that such an address is a valid packet list header address. The LIST-ID field contains a unique identification number assigned to a packet list when the packet list is created or initialized. LIST-ID is also compared to a corresponding field in an incoming packet's header for further packet address validation when the packet reaches its destination list. Such comparison of LIST-ID provides verification that the list has not been re-initialized since the last time that the packet sending process obtained the LIST-ID value. Hence, the LIST-ADR and LIST-ID fields provide a double validation process for incoming packets.

LIST-ITEMS contains the number of items on the packet list. The number of items on a packet list is changed when ROUTE-PACKET adds packets to the list and when GET-PACKET or GET-PACKET.TN removes packets from the list.

LIST-QHEAD and LIST-QTAIL are pointers to the beginning and end of a queue of inactive tasks waiting to take packets from the list. Each inactive task that is waiting on the inactive queue maintains a pointer to the next task, if any, that is also waiting on the inactive queue. When ROUTE-PACKET adds a packet to a list, the first waiting task, if any, is re-activated. Additionally, ROUTE-PACKET obtains the pointer to the next inactive task, if any, from the re-activated task, and places the pointer into the LIST-QHEAD field of the packet list header. When such an inactive task is provided with a packet from the list, the next task, if any, on the task queue, indicated by LIST-QHEAD, is moved to the head of the queue.

The inactive task queue mechanism provides the capability for a packet list to be serviced by two or more tasks. This capability to share packet lists among selected tasks enables multi-threaded, concurrent service of packets from a list. If one such task is busy, another task may take the next packet on the list. The inactive process queue pertaining to a destination list is also checked by ROUTE-PACKET whenever a packet is attached to the list in order to re-activate the first inactive task waiting to service a packet from the list.

The LIST-PHEAD and LIST-PTAIL entries in the packet list header are pointers to the beginning and end of the packet list. The values contained within the entries LIST-PHEAD and LIST-PTAIL are manipulated by ROUTE-PACKET and GET-PACKET to indicate the heap addresses of the respective first and last packets on the packet list.

A task may process packets on more than one packet list by setting its 'LIST value to some other packet list header address determined by appropriate application software. In this way, a single task can service packets from more than one packet list.

Packet Structure

The structure of an exemplary packet is shown in FIG. 10. The packet 34 includes a packet header 37 and a series of free-form data fields 32 of variable length. The packet header 37 includes the 5 four-byte fields designated as PKT-NEXT, PKT-LEN, PKT-DNODE, PKT-DADR, PKT-DID, PKT-SNODE, PKT-SADR, and PKT-SID, the one-byte fields designated as PKT-ATTR and PKT-STAT, and a two-byte field designated as PKT-TYPE. Of course, in alternative embodiments, the lengths of the packet header fields can be selected to provide more or fewer available permutations within each field.

A task-local variable 'PKT 35 points to the packet currently of interest to the task. The data portion 32 of the current packet can be found using a constant offset from 'PKT in embodiments wherein a constant packet header length is employed.

PKT-NEXT is a pointer to the next packet in the packet list, if any. When ROUTE-PACKET attaches an incoming packet to the end of a packet list, ROUTE-PACKET sets the PKT-NEXT field of the incoming packet to NULL and sets the PKT-NEXT field of the packet that had been the last packet on the list, as indicated by LIST-PTAIL, to the heap address of the incoming packet. Then, ROUTE-PACKET sets LIST-PTAIL to the address of the incoming packet and also sets 'PKT of the invoking task to NULL.

When an incoming packet is attached to an empty packet list, i.e. LIST-PHEAD=NULL, then ROUTE-PACKET sets LIST-PHEAD to point to the heap address of the incoming packet in addition to setting LIST-PTAIL and PKT-NEXT as described above.

PKT-LEN indicates the length of data, in bytes, that are encapsulated within the data field 32 of the packet.

The combination of the variables PKT-DNODE, PKT-DADR, and PKT-DID, comprises a unique destination packet list identification number, or PKT-DLID. The PKT-DLID 38, in the packet header is used by ROUTE-PACKET to direct packet delivery. PKT-DNODE is the number of the node upon which the destination packet list resides. PKT-DADR is the address of the destination packet list header in the heap of the destination packet list's node, which should be the same value as contained in the LIST-ADR field of the destination packet list header. PKT-DID should contain the same value as the LIST-ID field in the destination packet list header and is used for double validation of the destination packet list.

The list identification of the originating task's list, or the SLID 39, is also encoded into the packet in the fields PKT-SNODE, PKT-SADR, and PKT-SID. PKT-SNODE contains the node number of the sending task. PKT-SADR contains the address of the sending task's packet list header (i.e., the sending task's 'LIST value). PKT-SID contains the LIST-ID value from the sending task's packet list header. The SLID field values are set to the corresponding task-local values obtained when the packet was originally created. The SLID values may be modified after creation of the packet and before ROUTE-PACKET is invoked by the originating task. Such a mechanism provides the ability for a first task to send packets to a second task and to have the second task send any resulting responses to a third task. For example, in an application utilizing parallel computation, a first task can assign portions of the computation to each of a plurality of computational tasks in the network by sending out packets defining each of the assigned portions. In so doing, the first task can set the SLID field of each of the packets to identify a packet list that is serviced by a third task responsible for interpreting and integrating the results generated by each of the computational tasks.

The field PKT-ATTR refers to and indicates an attribute of the packet. In general, the PKT-ATTR field indicates whether the packet contains system instructions or otherwise requires special handling.

The field PKT-STAT is a packet status field that is used to indicate packet delivery errors. PKT-STAT may be set to indicate particular types of delivery errors. The field PKT-TYPE indicates the type of the packet. Packet type varies with the function of the packet.

Packet Attributes

The packet header 37 includes the field PKT-ATTR for designating special attributes, if any, of the packet. If the PKT-ATTR field is non-NULL, the packet may require special handling. In a preferred embodiment, four attribute designations may be used. The attributes are designated by setting particular bits within PKT-ATTR in such a way that attribute designations are not mutually exclusive. Hence a single packet may have a combination of two or more attributes. The preferred designations are system constants indicated by the following names:

1) NULL indicates that the packet is a standard packet and requires no special handling;

2) The designation, SERVICE-PKT, indicates that the packet is a service packet and contains system instructions to be interpreted by the destination task and/or by tasks servicing one or more intermediate packet lists, which may encounter the packet as it is routed to its destination;

3) RTN-REQ-PKT indicates that the sending task requests that the packet be returned if an error is encountered in delivery; and 4) RTN-ERR-PKT indicates that the packet is being returned to the sender as requested by the RTN-REQ-PKT designation, i.e. because an error was encountered in delivery.

Packet Status

The packet header 37 includes the field PKT-STAT for designating packet delivery errors. In a preferred embodiment, PKT-STAT may be designated as one of five system constants:

1) PKT-STAT is set to NULL to indicate that there has been no error in delivery of the packet;

2) PKT-STAT is set to NODE-ERR in step 26 of ROUTE-PACKET to indicate that the packet has been addressed to a node that is not included in a router table;

3) PKT-STAT is set to LIST-ERR in step 29 of ROUTE-PACKET to indicate that a list validation test has failed whereby either the location indicated by PKT-DADR does not contain its address (i.e. the location is not a valid LIST-ADR) or PKT-DID and LIST-ID do not match;

4) PKT-STAT is set to LINK-ERR by a link-output task that has detected a link failure when the link-output task attempted to transmit the packet. In such an instance, bits within the PKT-STAT field may be set to indicate the port number of the failed link to an adjacent node; and 5) PKT-STAT can be set to a particular constant designated INET-ERR by a TCP/IP encapsulation task that interfaces to a TCP/IP internetwork in order to indicate a delivery failure in such an internetwork. Similarly, various designations can be used in the PKT-STAT field in order to indicate transmission failures incurred during transmission to corresponding networks to which the local network has access.

Packet Types

The packet type field, indicated as PKT-TYPE, is used to indicate that the packet belongs to a selected type. Many types of packets may be employed by the network. General types of packets may, for example, be designated standard packets or service packets. Standard packets may also include interpreter packets. Service packets include boot packets and idle packets. Standard packets contain information in free-form data fields of arbitrary defined length. Most packet routing involves standard packets.

Interpreter packets are variants of standard packets which contain instructions for the receiving task to interpret and execute. Additionally, interpreter packets may include parameter fields for containing parameters for the destination task to employ in the execution of the instructions. An interpreter packet 55 is structured as shown in FIG. 11. An interpreter packet is structured as any other packet and thus includes a packet header 37 and a packet data section 32. The first item in the packet data section, STACK DEPTH, is the number of parameters to be placed onto the stack of the destination task and to be employed in the execution of a command string. After the parameters, $P_{1 \ldots n}$, the remaining items in the data section of an interpreter packet are treated by the destination task as a command string entered directly to the destination task. The instructions within interpreter packets may include high-level commands which are interpreted at their destinations. Interpreter packets usually include an interpreter task reply mechanism whereby the command string includes instructions for the destination task to construct a reply packet and send the reply packet back to the task which originally sent the interpreter packet or to a designated third task.

Idle packets are service packets that contain no data. Idle packets are normally sent by link-output tasks after timeout delays incurred when there are no entries in their associated packet lists. Whenever a packet of any kind is sent across a link by a link-output task, a hardware level send/receive/acknowledge mechanism is monitored by the link-output task. The normal operating mode of a link-output task is to run GET-PACKET.TN and then to send an idle packet upon timeout. By sending idle packets when there are no packets sent for a predetermined time period, a link-output task is kept current regarding the status of its link and hence the status of the adjacent node with which it regularly communicates.

Yet another type of service packet is a boot packet. Boot packets are service packets which are sent from one node to start or re-start another node. Boot packets contain the requisite executable code and data structures associated with node initialization.

In general, executable binary code may be routed from one node to another node via the packet routing system. Such binary packets differ from interpreter packets in that the data field contains pre-compiled instructions that may be directly executed by a processing unit upon receipt of the instructions without requiring the interpretation by another task. For example, a binary packet may be routed directly to a node that is prepared to receive booting codes. The special handling required for a binary packet can include header removal when the contents of the binary packet are to be downloaded to a processing unit.

Creating and Sending a Packet

Two commands that govern packet creation are FREE-PACKET and NEW-PACKET. Both of these commands may be invoked by tasks within the network in order to respectively discard a current packet or to generate a new packet.

FREE-PACKET 94, shown in FIG. 2, is used to release the current packet, if any, pointed to by 'PKT and to set the value of 'PKT to NULL. Upon invocation 95, a test is made in decision step 96 as to whether 'PKT is NULL. If 'PKT is NULL, then FREE-PACKET 94 ends having done nothing. If 'PKT is not found to be NULL in step 96, the heap buffer containing the current packet pointed to by 'PKT is released, 'PKT is set to NULL in step 97, and FREE-PACKET then exits in step 98.

NEW-PACKET 03, shown in FIG. 3, does the majority of the work associated with packet construction. When NEW-PACKET 103 is called, the invoking task provides the size of the packet to be constructed and the DLID for the packet. Upon starting at step 104, NEW-PACKET 83 calls FREE-PACKET 94, in step 105a, to release the invoking task's current packet, if any. Then in step 105b, NEW-PACKET 103 appropriates sufficient heap space for the packet and loads the starting address of the packet buffer into 'PKT. NEW-PACKET then proceeds, in step 105c, to place the source list identification values into the packet header. PKT-SNODE is set to TNODE, PKT-SADR is set to 'LIST, and PKT-DID is set to the LIST-ID value of the list to which 'LIST points. Then, in step 105d, other header fields may be set in accordance with parameters with which NEW-PACKET was invoked. Finally, NEW-PACKET exits in step 106. The invoking task may then change the header fields or set other packet fields as desired before calling ROUTE-PACKET 20 to send the packet.

It should be noted that the DLID fields in the packet header should be set before ROUTE-PACKET is called. In instances where a sending task is not apprised of the DLID of the destination packet list to which the sending task intends to send a packet, the sending task can send an interpreter packet to the kernel task of the destination node requesting the DLID of the desired destination packet list. In a preferred embodiment, the list addresses and LIST-ID's of kernel tasks have characteristic values so that the kernel task of any node may be reached without needing any information other than the node number. In instances wherein the sending task is not apprised of the node number of the destination list, a request may be made of some other task or node, such as the librarian, regarding the node number or DLID of the destination list.

Figure 14:
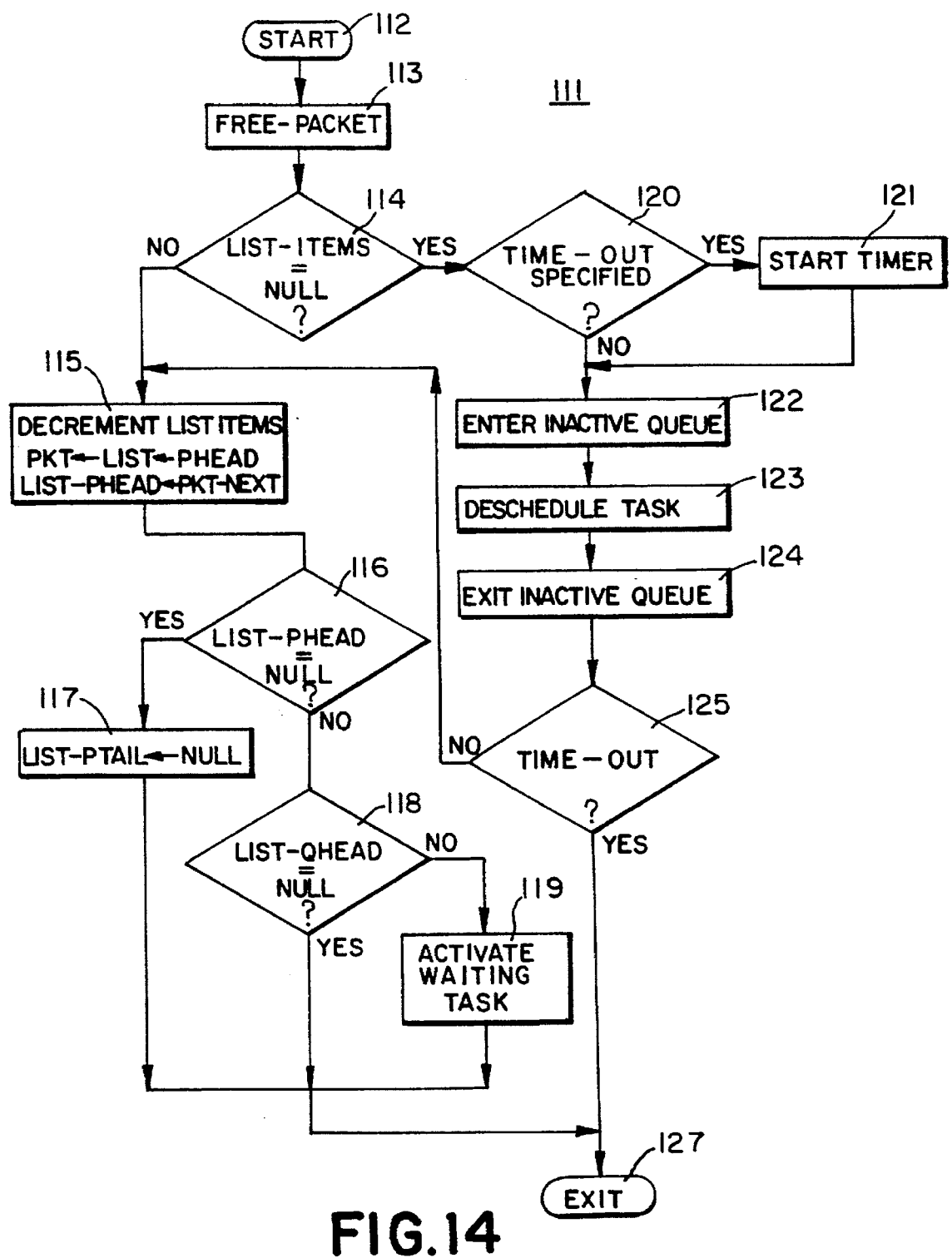
FIG. 14 is a logical flowchart of a procedure used by tasks to obtain packets from packet lists.

In order to obtain packets from a packet list, tasks may call the routine GET-PACKET to wait indefinitely for a packet to arrive upon the packet list indicated by 'LIST. Alternatively, the routine may be invoked as GET-PACKET.TN in order to wait a finite timeout interval (N milliseconds) for a packet to arrive. A flowchart of the routine is shown in FIG. 14.

Specifically, after GET-PACKET 111 is invoked in step 112, FREE-PACKET is called, in step 113, to release the current packet, if any, pointed to by 'PKT. Then in step 114, the LIST-ITEMS field of the packet list header pointed to by the 'LIST value of the invoking task is tested to determine whether there are no packets on the list, i.e. LIST-ITEMS= NULL. Alternatively, GET-PACKET could check the LIST-PHEAD field of the packet list header to determine whether the LIST-PHEAD field is set to NULL, which would also indicate that the packet list is empty. If it is found in step 114 that there are packets on the list, then GET-PACKET proceeds to step 115. If there are no packets on the list, then GET-PACKET proceeds to step 120.

At step 120, GET-PACKET branches to step 121 if GET-PACKET was invoked with a specified timeout interval (i.e. as GET-PACKET.TN). In step 121, a timer is set to provide a re-activation signal to the invoking task after the specified timeout interval has elapsed. After setting the timer, or if no timeout interval was specified, GET-PACKET proceeds to step 122 wherein the task is placed upon the inactive process queue. During step 122, the task indicated by LIST-QTAIL, if any, is provided with a pointer to the invoking task in order to link the invoking task into the queue. Additionally, LIST-QTAIL is set to point to the invoking task, and the invoking task's queue pointer is set to NULL. If, in step 122, the invoking task is the first task to arrive on the inactive queue, then LIST-QHEAD is set to point to the invoking task. Then in step 123, the invoking task is de-scheduled and ceases to execute until receiving a signal to restart.

When the invoking task is re-activated, a task-local flag is set by the re-activating process to indicate the condition which caused re-activation. Such a re-activation flag may be used to indicate whether the re-activation was caused by expiration of a timer or by a signal from another task. Re-activation from step 123, may be caused by expiration of the timer set in step 121 or by a signal from ROUTE-PACKET indicating that a packet has arrived upon the list. In either event, execution resumes at step 124 wherein the invoking task is removed from the inactive process queue.

In step 124, LIST-QHEAD, LIST-QTAIL, and the queue pointers among the inactive tasks, if any, are adjusted as necessary in order to remove the invoking task from the inactive queue and to maintain the integrity of the inactive queue.

Then, beginning at step 125, GET-PACKET determines whether the task was re-activated as the result of a packet having arrived on the list during step 123. At step 125, the re-activation flag is tested to determine whether re-activation occurred as the result of a timer signal. If re-activation was caused by timer expiration, GET-PACKET proceeds to step 127 and exits. If, in step 125, it is determined that re-activation was not the result of a time-out signal, GET-PACKET proceeds to step 115 because a packet arrived on the packet list.

At step 115, the invoking task is provided with a packet which is removed from the packet list. The LIST-ITEMS field of the packet list header is decremented, 'PKT is set to LIST-PHEAD, and LIST-PHEAD is set to PKT-NEXT. Then, in step 6, a test is made to determine whether the removed packet was the last packet on the list, i.e. LIST-PHEAD=NULL. If the removed packet was the last packet on the packet list, then LIST-PTAIL is set to NULL, and then GET-PACKET exits in step 127. If, in step 16, it is determined that there are other packets on the list, then GET-PACKET proceeds to step 118.

In step 118, GET-PACKET determines whether there are any inactive tasks on the inactive process queue waiting for a packet from the current list. If there are no inactive tasks, i.e. LIST-QHEAD=NULL, then GET-PACKET proceeds to exit at step 127. If, in step 118, it is determined that there are inactive tasks waiting for a packet from the current list, then the inactive task indicated by LIST-QHEAD is re-scheduled so that the task may receive a packet and continue execution. Then GET-PACKET exits in step 127.

Packet Linking and Error Handling

Figure 15D:
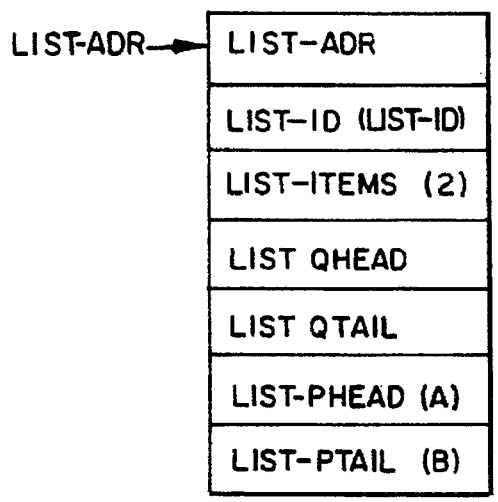
FIG. 15D is a memory map of a packet list header including pointers to the packets A and B of FIGS. 15A–C.

In situations in which the destination node of a packet, PKT-DNODE, is equal to the current node number, TNODE, packets are linked to their destination lists in step 30 of ROUTE-PACKET 20 after the packet destination is validated in step 27. In order to illustrate the salient aspects of packet linking in such cases, consider the packet list header shown in FIG. 15D. Throughout the example of FIG. 15D, data fields shall be labelled as previously defined and parentheses shall be used to indicate the data field contents. As seen in FIG. 15D, the variable 'LIST of a particular task points to the LIST-ADR field of a packet list header. The LIST-ADR field contains its own heap address. There are two packets on the list as indicated by the LIST-ITEMS field designating (2). The first packet on the list is indicated by the LIST-PHEAD field to reside at address (A). The second and last packet on the list is indicated to reside at address (B) by the LIST-PTAIL field.

Figure 15A:
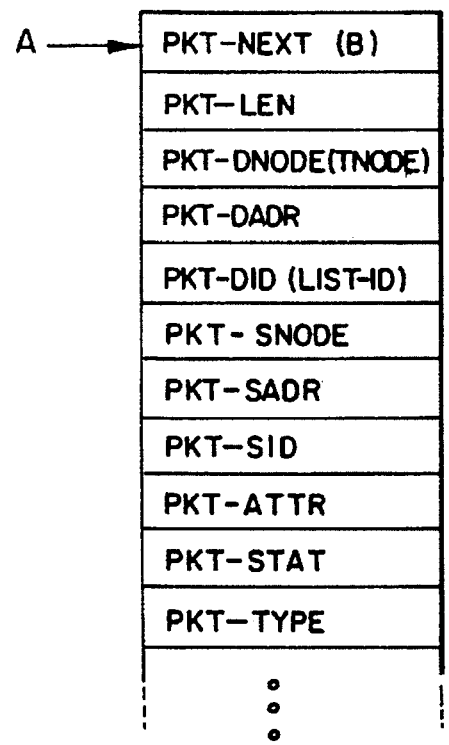
FIG. 15A–C are memory maps of packets A, B, and C.
Figure 15B:
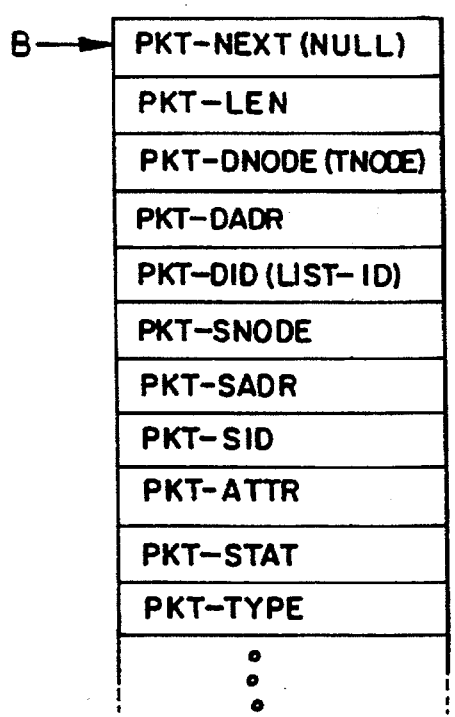

The two packets A and B are shown in FIG. 15A and FIG. 15B respectively. The PKT-NEXT field of packet A points to the location (B) of packet B. The DLID fields, PKT-DNODE, PKT-DADR and PKT-DID respectively, of both packets match the pertinent fields, LIST-ADR and LIST-ID, of the packet list header shown in FIG. 15D.

Figure 15C:
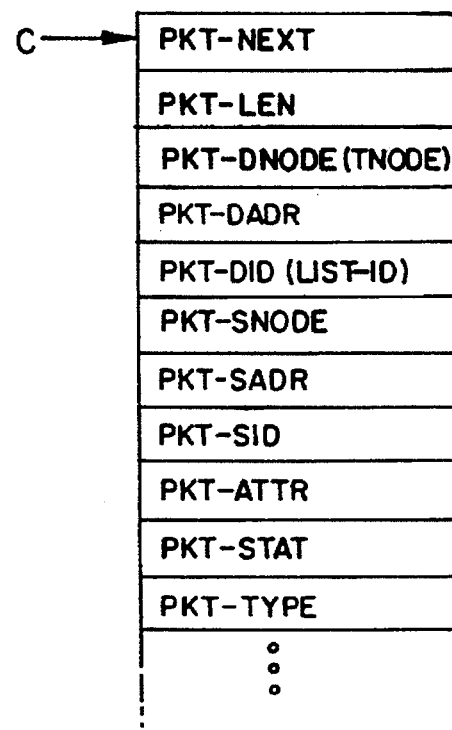
Figure 16:
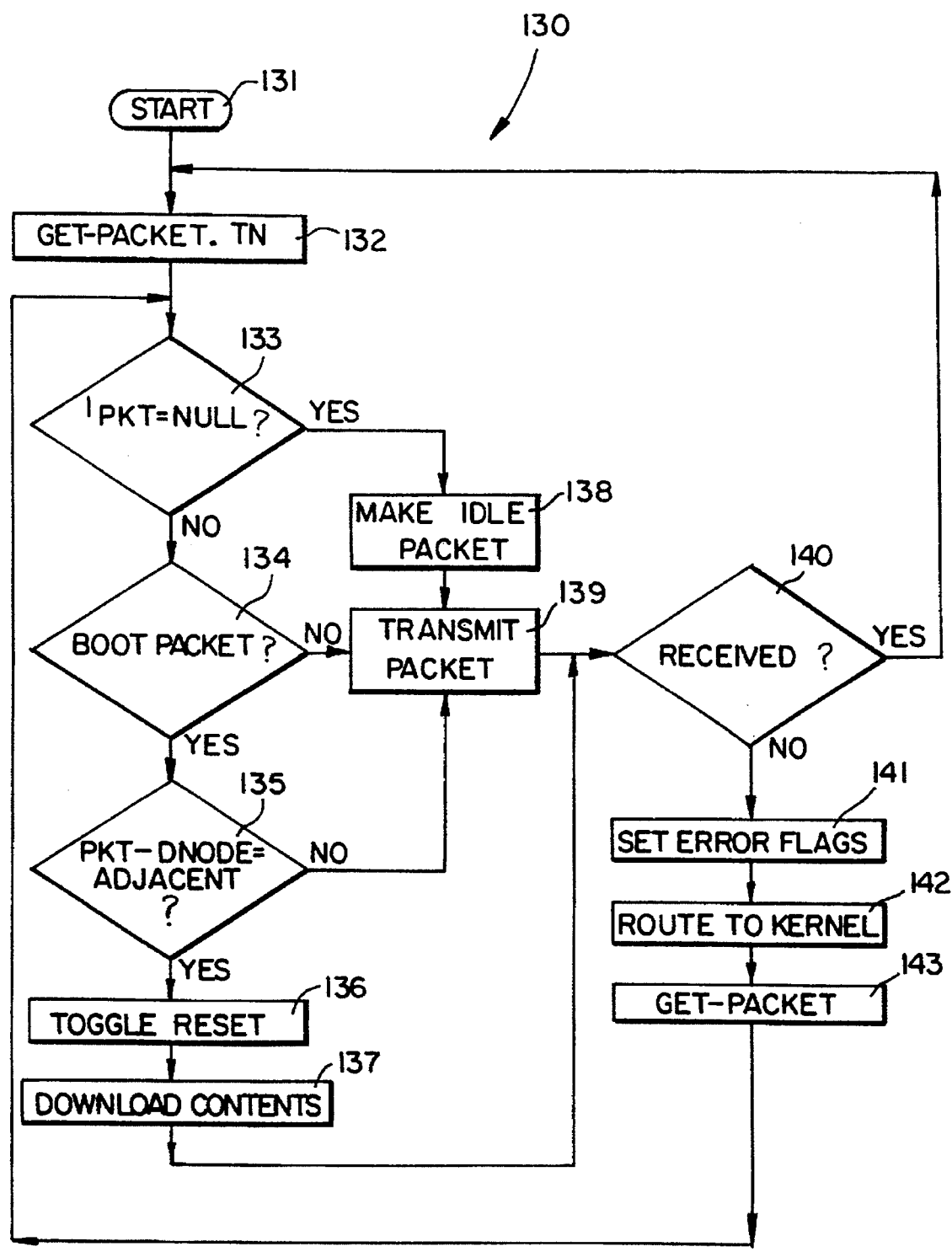
FIG. 16 is a logical flowchart of a link-output task.

As shown in FIG. 15C, a new packet C is now addressed to the current list. Packet C has been stored at location C by another task which has then invoked ROUTE-PACKET to send Packet C to the destination packet list. Referring to FIG. 2, ROUTE-PACKET 20 proceeds to step 22 and examines the packet header. In step 22, ROUTE-PACKET compares the destination node, PKT-DNODE, of Packet C to the current receiving node, TNODE. Since, in this example, PKT-DNODE=TNODE, ROUTE-PACKET proceeds to the DLID validation step 27.

Figure 4:
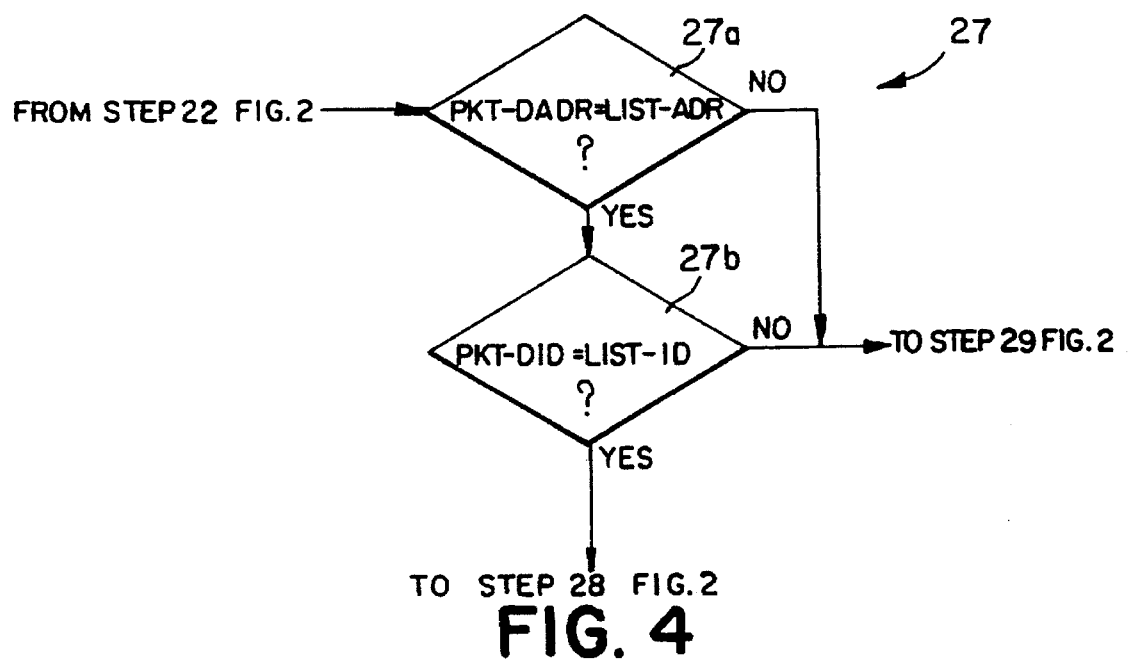
FIG. 4 is a logical flowchart detailing one of the procedural steps of the packet routing procedure of FIG. 2 in which a list identifier for the destination of a packet is validated.

The DLID validation step 27 of ROUTE-PACKET 20 may be performed as shown in FIG. 4. The first test performed in step 27a is to compare the contents of the PKT-DADR field of Packet C to the contents of the heap location to which PKT-DADR points. A match between the value of PKT-DADR and the value contained in the heap location having the address PKT-DADR indicates that PKT-DADR could be a valid packet list header address since the first field of a packet list header, LIST-ADR, contains its own address.

Figure 5:
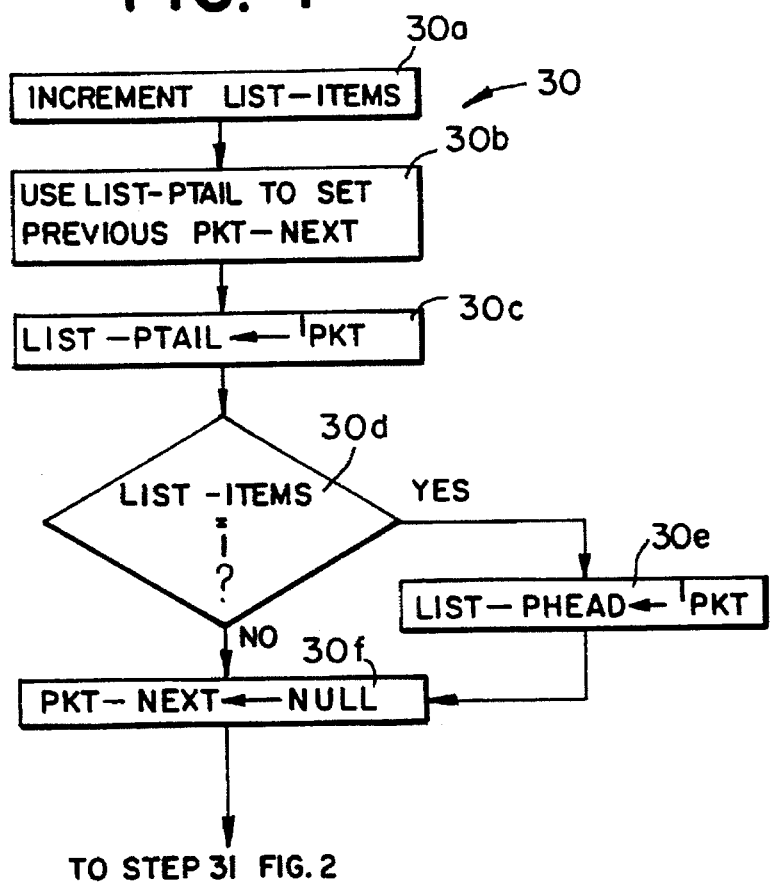
FIG. 5 is a logical flowchart detailing one of the procedural steps of the packet routing procedure of FIG. 2 in which packets are attached to a list.

The second validation test, at step 27b, compares the incoming PKT-DID field to the LIST-ID field. Passing this test will cause ROUTE-PACKET's list pointer to be set to PKT-DADR in step 28 so that step 30 of ROUTE-PACKET will attach the packet to the packet list indicated by the list pointer. If either of these tests 27a or 27b had failed, ROUTE-PACKET would have set PKT-STAT to LIST-ERR and would then have set the list pointer to a designated packet list header address for further error handling by the kernel, or other designated error-handler, according to the attributes of the packet. Likewise, whenever ROUTE-PACKET encounters a node error in step 24, PKT-STAT is set to NODE-ERR and the list pointer is set to a designated packet list header for further error handling according to the packet's attributes. Such a designated packet list header may correspond to a packet list that is serviced by the kernel task of the local node. Usually, a packet is attached to a packet list in step 30 of ROUTE-PACKET such as is shown in the FIG. 5.

Alternatively, ROUTE-PACKET can be adapted for discarding particular error packets. For example, when ROUTE-PACKET detects a packet delivery error, such as in steps 26, 28, or 29, ROUTE-PACKET may examine the PKT-ATTR field in order to determine whether the packet is being returned in accordance with PKT-ATTR=RTN-ERR-PKT. Such a condition would signify that the packet had encountered a delivery error as it was being returned due to a prior delivery error. In order to prevent the network from accumulating such packets that have become isolated from both their recipient and their sender, ROUTE-PACKET can readily be modified to discard such packets or to route such packets to a designated error-handling task. If PKT-ATTR does not include RTN-ERR-PKT, ROUTE-PACKET may either return or discard the packet in accordance with the indication provided by PKT-ATTR=RTN-REQ-PKT.

In the present example, the newly-arrived packet C and the packet list header shown in FIG. satisfy the validation criteria of step 27, i.e. both validation tests pass, and ROUTE-PACKET proceeds to step 30. Step 30a increments the LIST-ITEMS field, in this example, from the value of two, representing Packets A and B, to a value of three, representing Packets A, B and C. Step 30b then uses the value of LIST-PTAIL to find Packet B and then sets the value of PKT-NEXT of packet B to the value of 'PKT of the task which invoked ROUTE-PACKET. In this example, ROUTE-PACKET will set PKT-NEXT of packet B to the value C, i.e. the address of packet C in the heap. Then, in step 30c, the location of packet C is moved into LIST-PTAIL, replacing the former value of B. Then, in step 30d, it is determined whether the incoming packet is the first and only packet on the receiving packet list. In this example, since Packet C is the third packet, step 30d is not satisfied and control passes to step 38f wherein PKT-NEXT of packet C is set to NULL, since, as Packet C is the last packet on the list, there is no next packet. If, in step 30d, it is determined that an incoming packet is the first and only packet on the receiving packet list, ROUTE-PACKET proceeds to step 30e. In step 30e, the value of 'PKT of the invoking task, i.e. the heap address of the incoming packet, is placed in the LIST-PHEAD field of the receiving packet list header to indicate that the incoming packet is the first packet on the receiving list. Then, ROUTE-PACKET sets the PKT-NEXT field to NULL in step 30f since the incoming packet is the last packet on the destination list.

It should be noted that while ROUTE-PACKET always attaches a packet to a list, it does not require in all cases that such list header fields as LIST-ID match such packet header fields as PKT-DID. Packets are occasionally attached to lists other than their ultimate destination lists thus not requiring the PKT-DID validation procedure in step 38. Packets for which PKT-DNODE does not equal TNODE, for example, are attached to a list obtained from the router table without regard for the contents of the PKT-DADR or PKT-DID fields.

Boot Packets and Interface Tasks

A packet that has its PKT-TYPE field set to indicate that it is a boot packet and its PKT-ATTR field set to contain the system constant SERVICE-PKT is a specialized packet called a boot packet which is used to send booting instructions to a node. The data field of a boot packet includes executable code that restarts a node by loading the pre-compiled kernel, setting up the kernel task and its structures, and generally initializing the node so that it may operate. Boot packets destined for adjacent nodes are given special handling by the link-output tasks that transmit them. When a link-output task of a functioning node transmits a boot packet destined to an adjacent node, the link-output task of the operational node may reset the adjacent node if an appropriate reset-out line is provided in parallel with the bi-directional data link to such adjacent node. After resetting the adjacent node, the link-output task of the operational node strips away the packet header of the boot packet and transmits only the executable contents and associated data structures of the packet data field.

A flow-chart for a link-output task is shown in FIG. 6. The basic function of a link-output task 130 is to pull packets from its associated packet list and then to transmit them to the adjacent node. After commencement at step 131, the link-output task 130 calls GET-PACKET.TN in step 132. Then, in step 133, a conditional test is made, such as 'PKT=NULL, to determine whether a packet was found on the list in the previous step 132. If 'PKT=NULL, a packet did not arrive before timeout and the link-output task creates an idle packet in step 138 and then transmits the idle packet to the adjacent node in step 139. If, however, a packet is found on the list before time-out, control passes from step 133 to decision step 134 wherein the PKT-ATTR and PKT-TYPE fields are checked to determine whether the packet is a boot packet. If the packet is determined not to be a boot packet at step 134, then the packet is transmitted by the link-output task to the adjacent node in step 139. If, however, the packet is determined to be a boot packet at step 134, PKT-DNODE is checked in step 135 to determine if the packet is destined for the adjacent node. If the boot packet is not destined for the adjacent node, then the packet is transmitted in step 139 as any other packet. If, however, the boot packet is determined to be addressed to the adjacent node in step 135, then the reset-out line to such adjacent node, if any, is activated in step 136. Then, in step 137, the header is removed from the boot packet and the remaining contents of the boot packet are downloaded to the adjacent node.

After transmitting a packet in step 139 or downloading the contents of a boot packet in step 137, decision step 140 determines whether the packet was received by the adjacent node. Such a determination is made by testing a timeout flag corresponding to a timer which is set in step 139. Before a link-output task transmits a packet, the approximate time required for packet transmission is calculated according to the length of the packet, indicated by PKT-LEN, and the data transmission speed of the channel. Then a timer is set to provide an input to the link-output task similar to the timeout mechanism discussed in connection with GET-PACKET.TN. The actual transmission of the packet is controlled by a hardware-level send/receive/acknowledge or handshaking mechanism such as a DMA transfer protocol. If the handshaking mechanism fails, then the packet will not be transmitted within the approximate time allotted. Hence, entry to step 40 will occur as the result of the timer having provided the link-output task with a time-out signal and the appropriate time-out flag.

If the packet was received, the link-output task returns to the normal get-and-transmit loop starting at step 132. If the link-output task 130 detects a transmission failure at step 140, control then passes to step 141 wherein the appropriate error fields within the packet header are set to indicate a transmission failure to the adjacent node, such as by setting PKT-STAT to LINK-ERR and by setting bits within PKT-STAT to indicate the i/o port which detected the transmission failure. The corresponding node number may then be determined from the adjacent table. In step 142, the packet is then sent to the kernel task or other error handler for further error processing. In order to expedite error handling in step 142, the link-output task may execute a subroutine call to a portion of ROUTE-PACKET beginning at step 20a of FIG. 2. In so doing, the link-output task provides the packet list header address of the packet list serviced by the designated error handling task so that the packet is attached directly to the indicated list. Then, the link-output task proceeds to step 143.

The link-output task 130 then calls GET-PACKET in step 143. The purpose of calling GET-PACKET instead of GET-PACKET.TN is to preclude the repeated transmission of idle packets to an unresponsive or non-existent node. If a packet arrives on the link-output task's list, or if the link-output task is otherwise awakened from step 143, the link-output task returns to step 133.

When a kernel task or other error handling task receives a packet indicating a packet transmission failure on a link to one of the adjacent nodes pursuant to step 142, and if the packet attribute field had been set to RTN-REQ-PKT then the kernel task may return the packet to the originating task and set PKT-ATTR to RTN-ERR-PKT. If yet another error is encountered during return of the packet, further error diagnostics may be performed. For example, the error-handling task, or ROUTE-PACKET, can be adapted to discard error packets in which PKT-ATTR is already set to RTN-ERR-PKT. The error-handling task can also send an interpreter packet to the librarian requesting that the librarian send a boot packet to the unresponsive node. Before sending out boot packets, the librarian determines whether it has recently sent a boot packet to the requested node as a result of reboot requests from nodes adjacent to the unresponsive node. If the librarian has received no other reboot requests for that node, then it sends a boot packet. Otherwise, the librarian may ignore the request until more such requests are received. The result of these operations is that, sooner or later, a boot packet will be sent to any unresponsive node of the network. The librarian may further be programmed to issue revised router tables to all network nodes, or a subset thereof, in order to re-route packets around chronically unresponsive nodes.

Figure 17:
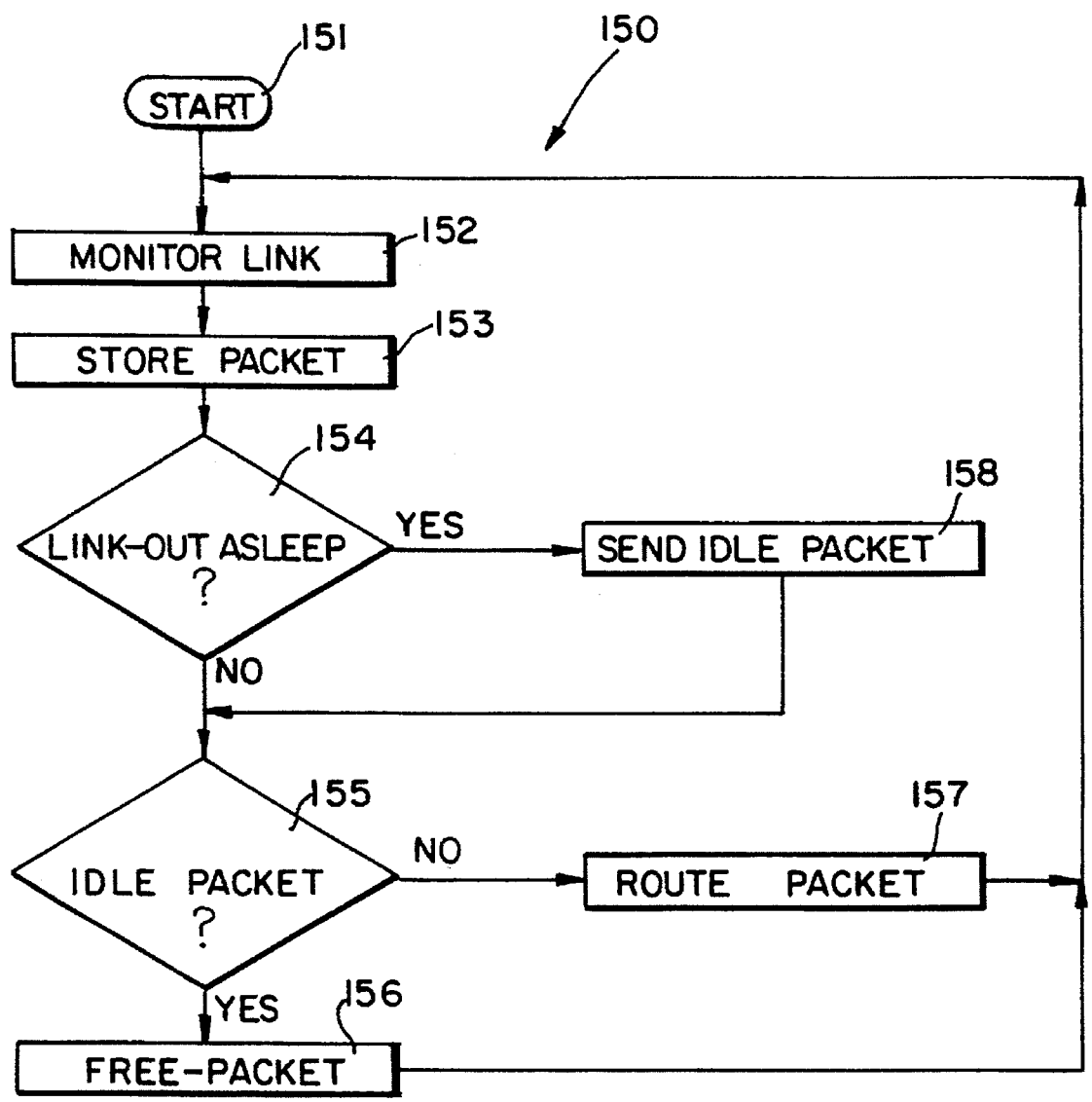
FIG. 17 is a logical flowchart of a link-input task.

The interface task responsible for receiving packets and storing them in the heap, i.e. the link-input task, also plays a role in establishing normal communication between nodes. An example flow-chart for a link-input task 150 is shown in FIG. 17. Upon starting at step 151, the link-input task monitors the port to which it is assigned to determine whether the link-output task on its adjacent node is transmitting a packet. If an incoming packet is detected in step 152, control passes to step 153 wherein the incoming packet is stored in the heap. When the link-input task 150 receives a packet, a test is made in decision step 154 to determine whether the link-output task on the same port of the same node as the link-input task has been running GET-PACKET in response to the link-output task having previously detected a failure of the adjacent node. If such link-output task has been running GET-PACKET, the link-input task proceeds to step 158 wherein the link-input task constructs an idle packet and sends it to the kernel task. The kernel task may then notify other tasks or nodes that the adjacent node or link has become reactivated. In the present example, the kernel task then sends the idle packet to the sleeping link-output task. The link-output task will then be awakened by ROUTE-PACKET. Successful transmission of the idle packet by the link-output task will cause the link-output task to resume normal operation wherein GET-PACKET.TN is executed to permit verification of an operating link to adjacent nodes.

The benefit of having the link-input task assist in returning the link-output task to normal operation is that normal operation of the link may be restored sooner than it might otherwise be restored. When the link-output task detects a failure of the adjacent node, the link-output task stops sending idle packets since there is no point in sending idle packets across an unresponsive link and possibly causing the generation of redundant boot packet requests. However, in the absence of notification obtained by passing an idle packet to the adjacent node, the link-output task would not be apprised of the resurrection of the link until the link-output task is itself re-activated. The link-output task will be reactivated by ROUTE-PACKET upon arrival of the idle packet on its list of packets to send to the resurrected node. Therefore, by including idle packet generation step 158 in the link-input task 150, the link-output task is returned to the practice of periodically sending idle packets so that any subsequent failures of the adjacent node will be promptly detected. After step 158, the link-input task proceeds to step 155.

If the link-output task is not detected to be asleep in step 154, the link-input task proceeds directly to step 155 wherein the link-input task determines whether the incoming packet is an idle packet. If the packet is an idle packet, the link-input task proceeds to step 156 wherein the packet is discarded using FREE-PACKET. Otherwise, the link-input task passes to step 157 and calls ROUTE-PACKET.

Inductive Booting

Among the contents of a boot packet sent to a predetermined node are the kernel task code; utility routine codes such as ROUTE-PACKET; node variables such as the node number; the node's router table; and an adjacent table. The adjacent table is simply a list of the adjacent nodes and the ports of the node to which the adjacent nodes are connected. For every non-null entry in the adjacent table, the kernel task spawns link-input and link-output tasks for the corresponding ports. The distinctive features of boot packets, adjacent tables, link-input tasks, and link-output tasks enable networks constructed according to the invention to be self-booting and self-repairing.

The node upon which the librarian resides includes at least one specialized interface task governing access to a data storage subsystem which contains the operating codes for other nodes in the network. If the resident node of the librarian is booted prior to its adjacent nodes, the link-output tasks of the resident node of the librarian will detect non-operational links to the librarian's adjacent nodes. Boot packet requests will subsequently be processed by the librarian causing boot packets to be transmitted to the adjacent nodes by the link-output tasks of the resident node of the librarian. The link-output tasks will reset the adjacent nodes and provide them with their initial boot code, adjacent tables and router tables. The link-output tasks of the newly booted adjacent nodes will then detect failures on links to their adjacent nodes, with the exception of the link-output tasks that communicate with any adjacent node that was previously booted. A further set of boot packet requests will consequently be processed by the librarian causing further inactive nodes of the network to be initialized in an inductive manner extending outward from the librarian's node or from a collection of nodes executing librarian tasks. This process may be extended indefinitely to allow inductive booting of any arbitrarily large network of arbitrary topology.

Figure 18A:
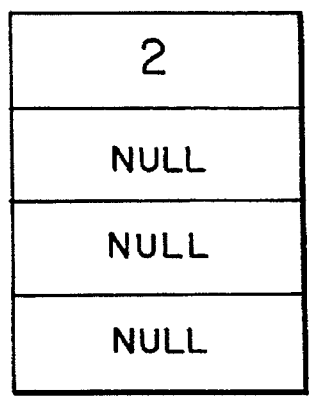
FIG. 18A–B are adjacent tables used by particular nodes of the network of FIG. 8.

In order to illustrate the inductive booting mechanism in greater detail, consider the initialization sequence of the network 60 of FIG. 8. RTC-1, Node 1, which may include a real time clock and perform various timekeeping functions, may be jumpered to boot from an on-board non-volatile memory such as a ROM. Upon booting from ROM, Node 1 may then toggle the reset line to LIB-1, Node 2, which is the resident node of the librarian. The booting instructions downloaded to Node 2 by Node 1 include instructions to initialize a specialized interface task to a data storage system 69 which is connected with Node 2 via an interface such as a SCSI interface 68. The adjacent table 160 initially supplied to Node 1 from ROM is shown in FIG. 18A. The first entry in the adjacent table 160 reflects that port 0 of Node 1 is connected to Node 2. The first entry is interpreted by the kernel task of Node 1 to spawn link-output and link-input tasks governing port 0 of Node 1. The null entries indicate that the other ports of Node 1 are not governed by link-input and link-output tasks.

Figure 18B:
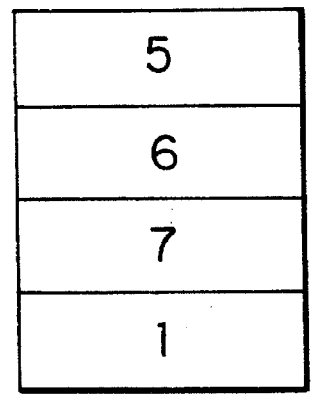

The adjacent table 161 shown in FIG. 18B, is supplied to Node 2. The values of the table 161 will be used by the kernel of Node 2 to spawn link-output and link-input tasks on the appropriate ports indicated in FIG. 8. Pursuant to table 161, port 0 of Node 2 will be assigned interface tasks, i.e. link-input and link-output tasks, to Node 5. Port 1 of Node 2 will be assigned interface tasks to Node 6. Port 2 of Node 2 will be assigned interface tasks to Node 7. Port 3 of Node 2 will be assigned interface tasks to Node 1.

The link-output tasks of Node 2 will, in short order, detect failure while attempting to send packets to the adjacent nodes, Nodes 5, 6, and 7. The failed packets will be set to indicate LINK-ERR and the port number, and will then be passed to the kernel of Node 2. Upon receiving each packet indicating a link error, the kernel task of an active node will determine the unresponsive node number and issue a reboot request by sending an interpreter packet to the librarian requesting that a boot packet be sent to the failed node. Boot packet requests will subsequently be issued from the kernel task of Node 2 to the librarian task. The librarian maintains records of boot packet requests so that boot packets are not reissued to a particular node repeatedly before a sufficient predetermined period of time has passed for the unresponsive node to receive and process the first boot packet sent in response to a reboot request. Boot packets will be issued from a task resident on Node 2 through the ports of Node 2, to Nodes 5, 6, and 7. Nodes 5, 6, and 7, will be supplied with appropriate executable code and data structures to begin operating. Then, the link-output tasks resident upon Nodes 5, 6, and 7 will detect unresponsive conditions of Nodes 3, 4, and 8. A subsequent round of boot packet requests will then be routed to the librarian task which will issue boot packets to selected link-output tasks on Nodes 5, 6, and 7. Thus the entire network 60 shall be inductively initialized.

An advantageous feature of the inductive booting mechanism is that all of the task codes and tables used throughout a network may be conveniently accessible on a single mass storage device. Hence, any or all of the functions of the nodes may be reprogrammed in a variety of ways. In addition, a node or group of nodes may be selectively re-booted or re-programmed without re-booting the entire network. The librarian may be resident upon a node which includes a personal computer for executing a librarian routine and a disk drive for storing pertinent codes and data structures for the various network nodes or a subset thereof. Rather than issuing boot packets whenever they are requested, the librarian may perform a variety of monitoring and diagnostic functions on the basis of error information contained within the boot packet requests. The librarian may re-assign tasks among nodes or re-program nodes by sending binary packets instead of boot packets so that the routing configuration may be altered to exclude a failed node while maintaining any necessary operations of the node.

The ability to reprogram nodes via binary packets without having to reset nodes, as is the case with boot packets, is particularly convenient for networks wherein not every node is capable of operating a reset line to its adjacent nodes. For example, printed circuit boards having several interconnected transputers and a standard PC card-edge connector may be used to provide a programmable network interface between a PC and various types of networks. Depending upon the architecture of the PC, a plug-in card of this type may or may not be resettable independent of the PC motherboard. Similarly, the individual transputers on the plug-in card may not be equipped with individual reset capability. In such circumstances where it would be necessary to reset a collection of nodes in order to effect a reset of a single node, it may be preferable for the librarian to eliminate a node from the network by issuing revised router tables and re-assigning any of the failed node's tasks if necessary. For example, a librarian may provide a selected transputer interface card with instructions to eliminate its host PC from the router table in the event of packet delivery errors to the motherboard. In such a scenario, necessary communication links within the LAN which are dependent upon the selected transputer card may be maintained without having to communicate with the host PC.

Additionally, any node in a network may be provided with its own non-volatile memory from which to load initialization instructions. Such nodes may be re-booted by adjacent nodes via operation of a reset line only. Hence, the librarian may issue an empty boot packet to such a node in order to cause its re-initialization by an adjacent node.

In alternative embodiments, several nodes may act in concert to execute librarian tasks at a single node or in a distributed manner throughout a network. In the event of deadlock or an irredeemable failure of a failed node, the librarian or librarians may be programmed to supply alternate router and adjacent tables. Hence the topological configuration of the network is adaptive in nature.

The Kernel Task

The operation of each node is generally managed by the kernel task. The kernel task performs the usual housekeeping and management functions of a system kernel in addition to the specialized functions required by the packet routing and inductive booting systems. These additional functions include: issuing reboot requests to the librarian upon receiving packets with PKT-STAT set to LINK-ERR, maintaining the router table and adjacent table, returning packets with PKT-ATTR set to RTN-REQ-PKT and setting PKT-ATTR to RTN-ERR-PKT if such packets are sent to the kernel for error handling, responding to DLID requests sent by tasks attempting to locate other lists on the kernel's node, passing idle packets to link-output tasks to cause resumption of normal operation when the link-input task detects adjacent node recovery, and initializing node utilities such as link-input and link-output tasks. The kernel task may also provide specialized functions particular to a predetermined type of node depending upon, for example, whether the node possesses its own non-volatile memory, is not independently resettable, or other such node features as discussed herein.

The kernel task may also perform diagnostic routines such as detecting multiple packet delivery errors.

Specialized Interface Tasks

Nodes in networks may include interfaces to non-transputer systems, such as mass-storage, remote sensors, controllers, or other computer networks. Such a node may maintain specialized interface tasks which may either transmit packets in an encapsulated form transparent to a non-transputer system or translate packet information into a format meaningful to the non-transputer system. Likewise, the input tasks of interface transputer nodes can be designed to interpret various data formats from the non-transputer system and then to construct packets for routing such information throughout the transputer network.

Figure 19:
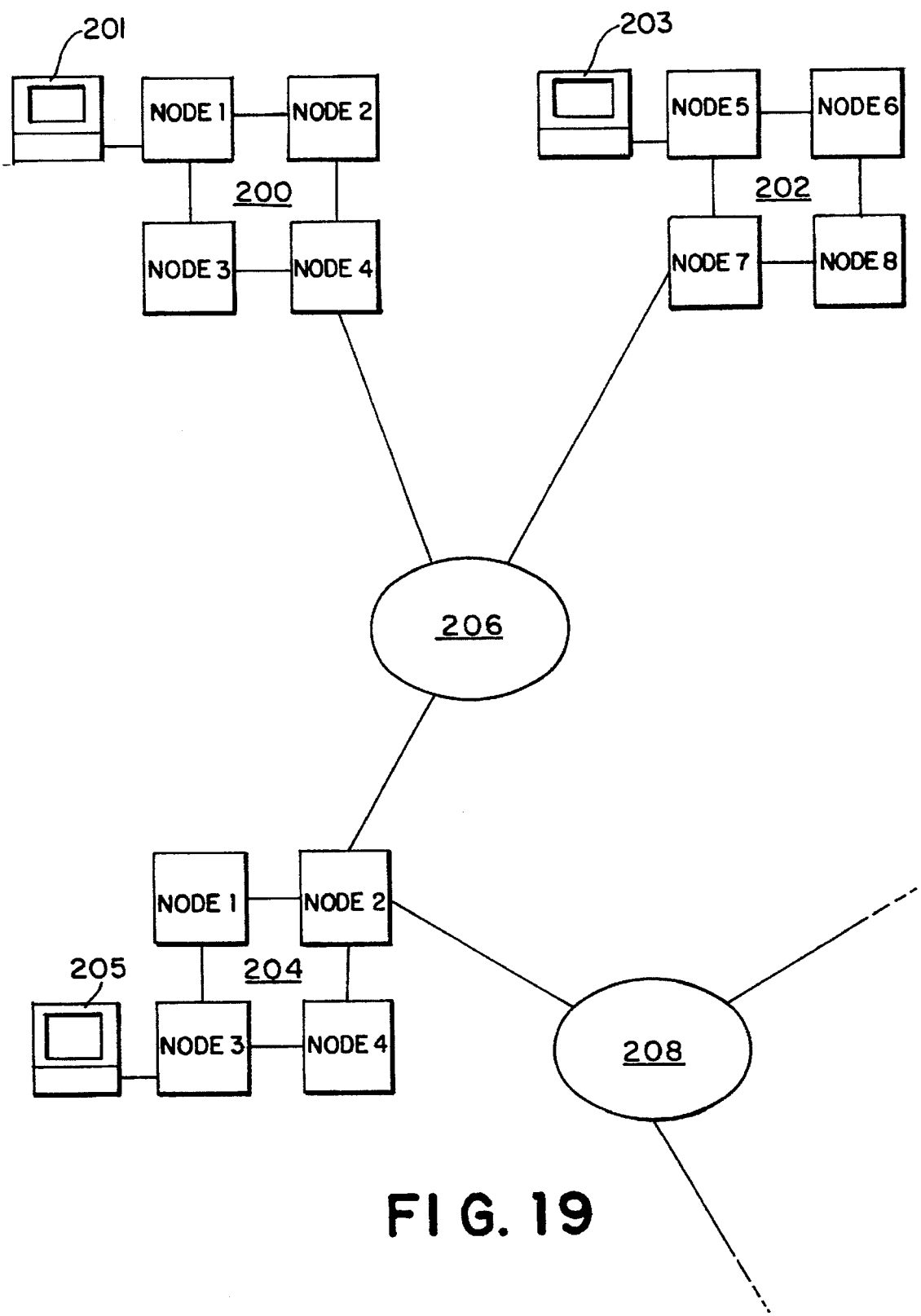
FIG. 19 is a functional block diagram of three local transputer networks that are connected by internetwork links.

For example, one or more transputer nodes in a local transputer network may include an interface to, for example, a TCP/IP-based internetwork. Referring now to FIG. 19, there is shown a local transputer network 200 having four interconnected nodes designated Node 1, Node 2, Node 3, and Node 4. Node 1 of the local network 200 includes a link to a console 201. Node 4 of local network 200 includes an interface to a TCP/IP internetwork 206. Also connected with the internetwork 206 is a local transputer network 202. The local transputer network 202 includes four nodes designated Node 5, Node 6, Node 7, and Node 8. Node 5 includes an interface to a console 203. Node 7 of the local transputer network 202 includes an interface to the internetwork 206.

Packets are routed within each of the local transputer networks 200 and 202 in accordance with the techniques described hereinabove. Additionally, interface tasks are resident upon Node 4 of local network 200 and Node 7 of local transputer network 202 to perform the functions of encapsulating outgoing packets into a format suitable for internetwork transmission and of decapsulating incoming packets from the internetwork 206 for routing within the respective local transputer networks.

As has been described previously, packet communication between transputer nodes located in different local transputer networks can be facilitated by assigning a globally unique node number to each of the nodes of the local transputer networks. For example, the router tables within local transputer network 200 can be arranged to cause ROUTE-PACKET to attach all packets destined for Nodes 5–8 to a packet list serviced by a TCP/IP encapsulation and transmission task on Node 4. Additionally, the TCP/IP transmission task on Node 4 can be provided with a look-up table or other mechanism for obtaining the inet address of Node 7 so that packet transmissions from the local transputer network 200 will be properly routed within the internetwork 206 to Node 7 of the local transputer network 202. When such a TCP/IP transmission is received by a TCP/IP reception task on Node 7, the packet is decapsulated and then routed to its destination within local transputer network 202.

Internetwork transmission of packets can be further facilitated by incorporating internetwork routing information, such inet addresses or ranges of inet addresses, into the router tables. For example, the PKT-SNODE and PKT-DNODE packet fields can be enlarged to contain a local transputer network node number concatenated with an inet address. The first two bytes of PKT-DNODE and of PKT-SNODE can be reserved for local node numbers, and the remaining portion of these fields can be reserved for inet address numbers. The router tables in a local transputer network, such as local network 200, can be arranged to cause all packets having inet addresses in the PKT-DNODE field to an intermediate packet list serviced by the TCP/IP transmission task on Node 4.

In order to minimize the instances wherein the TCP/IP interface task, or other such internetwork interface task, would be required to look up or otherwise obtain inet addresses, each of the TCP/IP transmission tasks can be arranged to insert the inet address of the local transputer network into the PKT-SNODE field whenever a packet is generated in the local transputer network and then broadcast into the internetwork. Then, a task in a remote transputer network can reply to the packet by using the SLID field in the same manner as can be performed within a local transputer network. Hence, communication between remote tasks does not differ in this regard to communication between local tasks.

Figure 20:
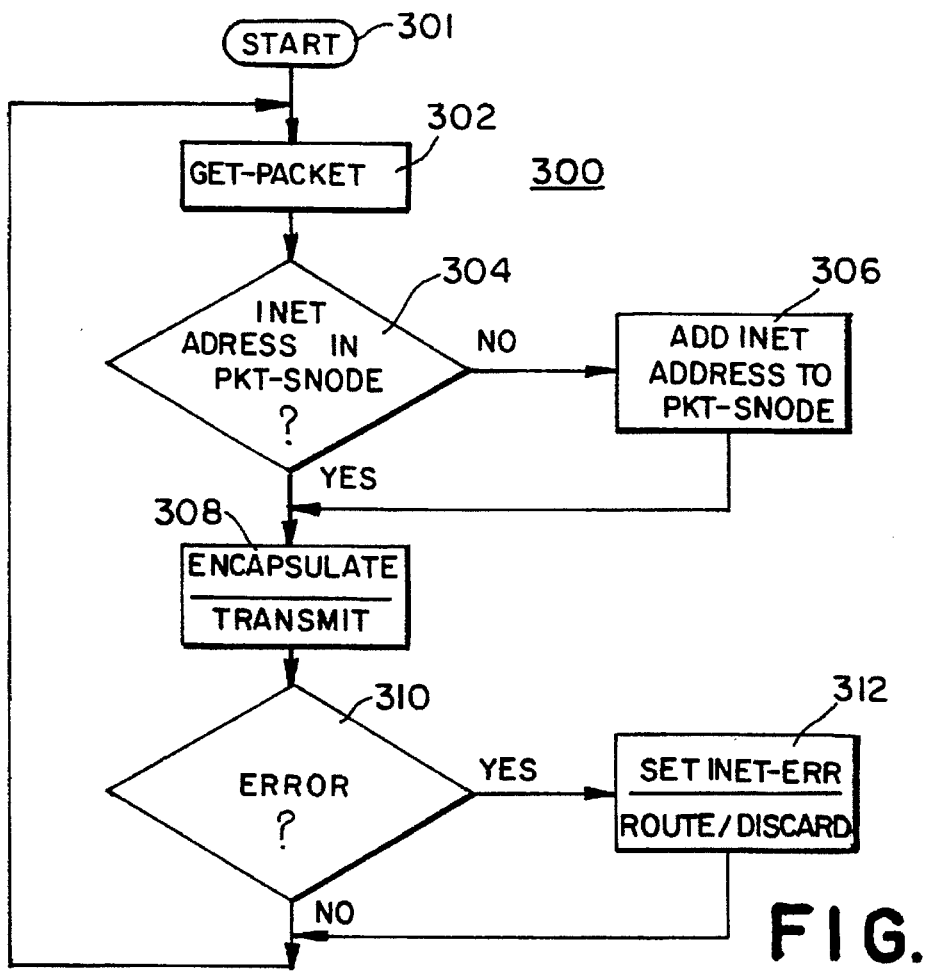
FIG. 20 is a logical flowchart of a procedure for transmitting packets from a local transputer network into an internetwork link.

In FIG. 20, there is shown a flowchart for an internetwork transmission task 300. Upon initialization at step 301, execution proceeds to step 302 wherein the transmission task 300 calls GET-PACKET. GET-PACKET can be invoked without a timeout, so that the task 300 will wait indefinitely for a packet to arrive on its packet list. Alternatively, the transmission task 300 can invoke GET-PACKET with timeout, so that the transmission task 300 can be adapted to perform other functions if there is no packet on the associated intermediate packet list that is ready for transmission. Proceeding from step 302 to step 304, the interface task examines the packet obtained in step 302 in order to determine whether an inet address is encoded into the PKT-SNODE field.

If, in step 304, there is no inet address in the PKT-SNODE field, signifying a locally-generated packet, then control passes to step 306 wherein the local inet address is encoded into the PKT-SNODE field. In step 306, the local node number in the PKT-SNODE field can be concatenated with the local inet address and the resulting combined address is placed into the PKT-SNODE field.

In step 308, the packet is encapsulated into a suitable format for transmission via internetwork 206. The packet is then transmitted into the internetwork 206. If necessary, the transmission task 300 may execute a look-up routine in step 308 in order to obtain the inet address corresponding to the remote network or node identified in the PKT-DNODE field. If, in step 308, the PKT-DNODE field already includes an inet address, then the packet is transmitted into the internetwork 206 and addressed to the inet address obtained from the PKT-DNODE field.

The transmission task then proceeds to step 310 wherein the transmission task determines whether a failure has occurred during transmission of the packet into the internetwork. If, in step 310, no error is detected, the transmission task 300 returns to step 302 to obtain the next packet on the packet list, if any.

If, in step 310, a transmission error is detected, then the transmission task 300 proceeds to step 312 wherein it is determined whether the PKT-ATTR field is set to indicate RTN-REQ-PKT and whether RTN-ERR-PKT is indicated. If RTN-REQ-PKT is set and RTN-ERR-PKT is not set, then PKT-STAT is set to INET-ERR, RTN-ERR-PKT is set, and the packet is returned to its sender. If, in step 312, it is determined that PKT-ATTR had previously been set to RTN-ERR-PKT, or if the packet does not indicate RTN-REQ-PKT, then the packet may be discarded. Then, the control transmission task 300 returns to step 302.

Figure 21:
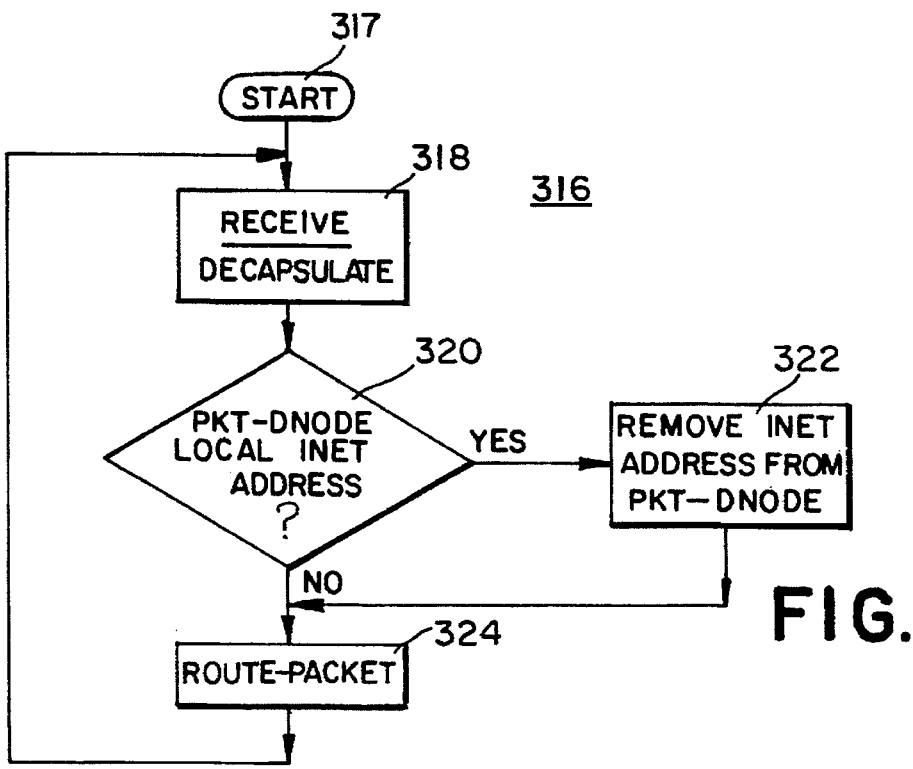
FIG. 21 is a logical flowchart of a procedure for receiving packets from an internetwork link into a local transputer network.

In FIG. 21 there is shown a procedure designated receive-task 361, for receiving incoming packets from a TCP/IP link. Upon initialization at step 317, the receive-task proceeds to step 318 wherein the receive-task waits for an incoming packet from the internetwork and decapsulates the incoming packet when it is received. Then, in step 320, receive-task determines whether the PKT-DNODE field of the incoming packet includes the inet address of the local transputer network. If, in step 320, the PKT-DNODE field includes the local inet address, then execution proceeds to step 322 wherein the inet address is removed from the PKT-DNODE field. Removing the inet address from the PKT-DNODE field, such as in step 322, will cause the packet to be routed within the local transputer network according to the remaining PKT-DLID rather than to be retransmitted into the internetwork. Execution then proceeds to step 324.

If, in step 320, PKT-DNODE does not include the local inet address, then execution proceeds to step 324. Thus, packets that are destined for other inet addresses will retain the inet address in the PKT-DNODE field until reaching the destination internetwork address.

In step 324, ROUTE-PACKET is invoked in order to route the packet. Then, the receive-task returns to step 318.

As can be appreciated, the use of inet addresses concatenated with local node numbers for packet routing via internetworks, relaxes the requirement that transputer node numbers be uniquely assigned on a global basis. Returning to FIG. 19, there is shown a local transputer network 204 that is connected with the internetwork 206. The local transputer network 204 includes a console 205 and four interconnected nodes that are assigned node numbers identical to the node numbers used in local transputer network 200. Such non-unique use of node numbers among respective local transputer networks does not cause any routing difficulties, since packets are routed within the internetwork 206 according to inet addresses, which are uniquely assigned to each local transputer network or node having an interface to the internetwork. Additionally, packets that are received into a local transputer network from the internetwork 206 are only routed to a local destination node when the local inet address is encoded into the PKT-DNODE field of the received packet's header.

Whenever a packet originating in a local network is transmitted into the internetwork, the inet address of the local transputer network is encoded into the PKT-SNODE field by the transmission task so that the recipient of the packet can respond to the originating task, or to an assigned response-handling task, in accordance with the SLID of the received packet. Thus, any packet can be responded to in the same manner irrespective of whether the packet originated within the local transputer network or within a remote transputer network.

As can be readily appreciated, the internetwork transmission task 300 only inserts the local inet address into the PKT-SNODE field of packets that do not already contain an inet address in the PKT-SNODE field. The receive-task 316 only removes inet addresses from the PKT-DNODE field when the inet address in the PKT-DNODE matches the local inet address. These features provide the ability to utilize a local transputer network or a single node of a local transputer network as an internetwork router. For example, Node 2 of local transputer network can also connect to an internetwork 208 in addition to the internetwork 206. The router table of Node 2 of local network 204 can be arranged so that inet addresses pertaining to internetwork 206 will be routed into internetwork 206, and inet addresses pertaining to internetwork 208 will be routed into internetwork 208. Thus, when a packet is received into Node 2 from internetwork 206, the packet will be routed into internetwork 208 whenever the received packet contains an inet address pertaining to internetwork 208. As can be readily appreciated, the routing system also provides the ability to route packets among several internetwork interfaces that may be connected to any of the nodes of a local transputer network.

The packet transmission and routing systems provide the ability for users at consoles 201, 203, and 205 to independently utilize system resources throughout the local networks 200, 202, and 204 in a manner that is transparent to the console users.

Among the applications presently contemplated for such a system is a distributed intelligent network analysis system. In such a network analysis system, an operator at console 203 can send interpreter packets or binary packets to remote nodes, such as Node 4 of local transputer network 200 and Node 2 of local transputer network 204, that will spawn network monitoring tasks upon the assigned nodes. The network monitoring tasks can function on their respective nodes in an independent manner so that the operator at console 203 can be informed of predetermined network traffic conditions without having to poll the monitoring tasks or otherwise intervene in order to obtain such reports. The network traffic monitoring tasks can be designed to generate traffic reports on the basis of a wide variety of predetermined conditions and then to send such reports, using packets, back to the console 203 where such packets can be further analysed and presented to the user in a form such as a graphical display. Because of the multi-tasking nature of the nodes of transputer networks 200, 202, and 204, additional users at consoles 201 and 205 can also assign distributed network monitoring tasks throughout the local transputer networks, or any other transputer networks that are accessible via the internetworks 206 and 208.

In a preferred embodiment, a local transputer network such as local network 200 can be physically implemented on a single card adapted to be inserted into a microcomputer, such as console 201. The local network 200 can obtain electrical power from the console 201, and the console 201 can act as the librarian node for local network 200 so that the local transputer network 200 will be inductively booted when the console 201 is booted.

From the foregoing disclosure and the accompanying drawings, it can be seen that a distributed computing network is provided wherein tasks may communicate in an asynchronous fashion using packets of information and routines for managing lists of pointers; wherein the details of communication between nodes are delegated to interface tasks thus enhancing software modularity and portability; wherein packets of information are routed among nodes without requiring the use of router chips or specialized switching networks; wherein the packet routing topology may be re-configured in real-time; wherein the entire network or any part thereof may be inductively booted from a node which includes a librarian; and wherein adjacent nodes continuously monitor the status of one another in order to reset and reboot failed nodes.

The terms and expressions which have been employed are used as terms of description and not of limitation and there is no intention in the use of such terms and expressions of excluding any equivalents of the features shown and described, or portions thereof, but it is recognized that various modifications are possible within the scope of the invention claimed.

What is claimed is:

1. In a multitasking system executing a plurality of tasks effective to issue function calls and to process packets of information, a system for accessing packets comprising:
    a plurality of packet lists, each list associated with a packet list header having pointers to packets on the list,
    routing means for routing packets to said lists, said routing means including attaching means for attaching packets to said lists, and
    obtaining means for obtaining a packet from a selected list and for providing a pointer to said packet in response to a call from one of said tasks, said obtaining means comprising:
        determining means for determining the presence of any packets on the selected list, and
        de-activation means responsive to said determining means for de-activating said calling task when there are no packets on the selected list,
    said routing means including activation means, responsive to said attaching means, for reactivating said calling task.

2. The system of claim 1 wherein said packet list header further comprises a queue pointer to a queue of tasks deactivated by said de-activation means, and said activation means comprises means for removing said calling task from said queue.

3. The system of claim 1 wherein said de-activation means further comprises timer means for re-activating said calling task after a selected period of time if said task is not re-activated by said activation means.

4. The system of claim 1 wherein said routing means comprises list validation means for validating that (i) a packet list header contains a value indicating that the packet list header is associated with a valid packet list, and (ii) a value within a packet corresponds to a value within the packet list header; and wherein said attaching means is responsive to said validation means for attaching the packet to a list when conditions (i) and (ii) are satisfied.

5. The system of claim 1 comprising:
    a plurality of interconnected processing nodes, and said routing means includes:
        a router table residing at a first node, for providing an associative mapping between selected processing nodes and packet lists residing at said first node;
        destination determining means for determining whether a packet residing at said first node is addressed to a second node;
        packet list address obtaining means, responsive to said destination determining means, for providing a packet list address to said attaching means on the basis of (i) a list address contained within a packet when the packet is determined to be addressed to a list residing at the first node, and (ii) a list address contained within the router table when the packet is determined to be addressed to the second node.

6. The system of claim 5 wherein said packet list address obtaining means is configured for providing a predetermined packet list address when the packet is determined to be addressed to said second node and when said second node is not among said selected processing nodes.

7. In a multitasking system executing a plurality of tasks effective to issue function calls and to process packets of information, a system for accessing packets comprising:
    a plurality of packet lists, each list associated with a packet list header having pointers to packets on the list,
    routing means for routing packets to said lists, said routing means including attaching means for attaching packets to said lists, and
    obtaining means for obtaining a packet from a selected list and for providing a pointer to said packet in response to a call from one of said tasks, said obtaining means comprising:
        determining means for determining the presence of any packets on the selected list, and
        de-activation means responsive to said determining means for de-activating said calling task when there are no packets on the selected list, said de-activation means including timer means for re-activating said calling task after a selected period of time if said calling task is not re-activated by said activation means, the period of time being selected in accordance with a parameter passed to said obtaining means by said calling task,
    said routing means including activation means, responsive to said attaching means, for reactivating said calling task.

8. A system for transmitting a packet from a first task to a second task, comprising in combination list means for storing packets on a packet list, said list means including a list header for providing pointers to the packet list and to a queue of tasks waiting for packets on the packet list, obtaining means responsive to said second task for obtaining a packet from a list, said obtaining means including de-activation means for de-activating said second task in the absence of a packet on the list and for placing said second task on said queue, and routing means responsive to said first task for placing the packet on the list, said routing means comprising re-activation means for re-activating said second task and removing said second task from said queue.

9. The system of claim 8, comprising:

timer means for reactivating said second task after a selected interval of inactivity subsequent to deactivation if said second task is not reactivated by said routing means, and wherein said obtaining means is selectively responsive to said timer means and said routing means for selectively obtaining a packet from a list in dependence upon whether said second task is reactivated by said routing means or said timer means.

10. The system of claim 8 wherein said obtaining means comprises activation means for activating a task identified in said queue.

11. A system for delivering packets within a network comprising a plurality of interconnected nodes, I. each node having:
  (a) an addressable memory for storing linked lists of packets, each list having a list header for providing information pertaining to the list, and wherein at least one of said lists is an output list comprising packets for transmission to an adjacent node,
  (b) a processor for executing tasks,
  (c) sending means for sending packets to an adjacent interconnected node including removing means for removing packets from said output list and transmitting means for transmitting packets from said output list to an adjacent node,
  (d) packet routing means residing at the node, said routing means operable by said processing means for attaching packets to lists, and
  (e) a router table containing at least one address of an output list header pertaining to said output list and associating said one address with at least one of said nodes;

II. each packet having:
  (a) a header containing:
    (i) a destination node field for indicating a destination node, and
    (ii) a destination list field for indicating the address of a destination list header within the memory of the destination node pertaining to a destination list, and
  (b) a body containing a plurality of data fields; and III. said packet routing means comprising:
  (a) determining means for determining whether the destination node field of a packet corresponds to the resident node of said packet routing means,
  (b) obtaining means for obtaining an address of one of said lists, said obtaining means including:
    (i) table consulting means for consulting the router table and for obtaining the address of an output list header pertaining to said destination node from said router table when said packet is destined for a node other than the resident node of said packet routing means, and
    (ii) header consulting means for obtaining said destination list header address from said packet header when said packet is destined for the resident node of said packet routing means, and
  (c) attaching means responsive to said obtaining means for attaching said packet to the list pertaining to the address obtained by said obtaining means.

12. The system of claim 11 wherein said table consulting means comprises error means for providing a predetermined address when said destination node is not associated with an output list header within said router table.

13. The system of claim 12 wherein said header consulting means comprises error means for providing a predetermined address when said list header address from said packet header does not correspond to one of said lists in said addressable memory.

14. The system of claim 11 wherein said removing means comprises:
  (a) de-activation means for de-activating said sending means when there are no packets on said output list, and
  (b) timer means for re-activating said sending means when said sending means has been de-activated for a selected period of time;

and wherein said packet routing means further comprises re-activation means responsive to said attaching means for re-activating said sending means.

15. A packet delivery system for delivering packets within a computing network having a plurality of nodes, each node having an identifier and an addressable memory, the delivery system comprising:

a plurality of linked lists of packets resident within said memories;

each respective list of packets having an associated list header including a pointer field for storing a pointer to the respective list of packets, an identification field for storing an identification value unique to the respective list, and an address field containing the address of the list header;

each packet having a destination node field for indicating the destination node of the packet, and a destination list field for indicating the address and identification value of the destination list header; and packet routing means resident upon said nodes for selecting a list and attaching a packet to said selected list, said packet routing means having:

comparing means for comparing said destination node field contents of the packet to the resident node, table means responsive to said comparing means for providing the address of the selected list when said comparison is non-identical, validating means for verifying that (i) the memory address indicated by the destination address value in the packet contains the destination address and (ii) said destination list identification value field of the destination list header matches the corresponding value in the packet, said validating means responsive to said comparing means when said comparison is identical, said validating means providing the address of the selected list when conditions (i) and (ii) are satisfied, error means for providing a predetermined list address upon failure of either said table means or said validating means to provide the selected list address, and linking means for linking the packet to the selected list provided by any of said table means, said validating means, or said error means.

16. A system for transmitting packets of information from a first node to a second node of a distributed computing network comprising:

a list in the memory of the first node for storing packets to be transmitted to said second node;

a communication link between said first node and said second node;

output means for operating said communication link; and obtaining means operable by said output means for removing a packet from said list and for providing the address of said removed packet to said output means, wherein said obtaining means is operable in a selected one of two modes of operation in dependence upon a selected parameter, and wherein said obtaining means includes:

timer means for de-activating said output means for a selected period of time when the list is empty and said parameter indicates said first mode, and de-activation means for de-activating said output means until a packet is attached to the list when the list is empty and said parameter indicates said second mode; and wherein said output means includes:

monitoring means for monitoring the operation of said communication link and for detecting successful transmission of a packet across said link, said output means operating said obtaining means:
(i) in said first mode when successful transmission is detected and
(ii) in said second mode when successful transmission is not detected; and idle means for producing and transmitting an idle packet when said selected period of time expires.

17. A system for transmitting packets of information from a first node to a second node of a distributed computing network comprising:

a list in the memory of the first node for storing packets to be transmitted to said second node;

a communication link between said first node and said second node;

output means for operating said communication link; and obtaining means operable by said output means for removing a packet from said list and for providing the address of said removed packet to said output means, wherein said output means comprises:

determining means for determining whether said removed packet contains initialization instructions for said second node, reset means operable by said first node for resetting said second node, and downloading means for downloading said initialization instructions to said second node so that said second node is initialized according to said initialization instructions.

18. A distributed computing network comprising:

a first node for executing a plurality of first tasks;

a librarian for storing and retrieving a library of code, said library including initialization code for said first node;

a second node for executing a plurality of second tasks, said second node connected with said first node and with said librarian by data communication links;

failure detection means for allowing said second node to detect a failure of said first node;

first node reset means connected with said first node, said first node reset means operable by said second node for resetting said first node;

request means for allowing said second node to request of said librarian to send said initialization code via one of said data communication links to said second node; and downloading means for downloading said initialization code to said first node from said second node subsequent to operation of said node reset means.

19. A distributed computing network comprising:

a first node for executing a plurality of first tasks;

a librarian for storing and retrieving a library of code, said library including initialization code for said first node;

a second node for executing a plurality of second tasks, said second node connected with said first node, and with a librarian by data communication links, said library further including second initialization code for initializing said second node;

failure detection means for allowing said second node to detect a failure of said first node;

first node reset means connected with said first node, said first node reset means operable by said second node for resetting said first node;

request means for allowing said second node to request of said librarian to send said initialization code via one of said data communication links to said second node;

downloading means for downloading said initialization code to said first node from said second node subsequent to operation of said first node reset means;

second failure detection means for allowing said first node to detect a failure of said second node;

second node reset means for allowing said first node to reset said second node; and second request means for allowing said first node to request of said librarian to send said second initialization code to said first node for downloading to said second node subsequent to operation of said second node reset means.

20. A distributed computing network comprising:

a first node for executing a plurality of first tasks;

a librarian for storing and retrieving a library of code, said library including initialization code for said first node;

a second node for executing a plurality of second tasks, said second node connected with said first node, and with a librarian by data communication links, said library further including second initialization code for initializing said second node;

failure detection means for allowing said second node to detect a failure of said first node;

first node reset means connected with said first node, said first node reset means operable by said second node for resetting said first node;

request means for allowing said second node to request of said librarian to send said initialization code via one of said data communication links to said second node;

downloading means for downloading said initialization code to said first node from said second node subsequent to operation of said node reset means;

second failure detection means for allowing said librarian to detect a failure of said second node;

second node reset means connected with said second node, said second node reset means operable by said librarian node for resetting said second node; and downloading means for allowing said librarian node to download said second initialization code to said second node subsequent to operation of said second node reset means.

21. A distributed computing network, comprising:
a first node for executing a plurality of first tasks;
a second node for executing a plurality of second tasks, said second node connected with said first node by a data communication means for communicating data;
failure detection means for allowing said second node to detect a failure of said first node;
node reset means connected with said first node, said node reset means operable by said second node for resetting said first node; and
storage means for non-volatile storage of initialization code for initialization of said first node, said storage means connected with said first node and operable by said first node subsequent to operation of said node reset means.

22. A distributed computing network comprising:
a plurality of intelligent interconnected nodes, each of said nodes adjacent to at least one other of said nodes;
data storage means for storing sets of initialization code for said nodes;
a librarian for operating said data storage means;
failure detection means for allowing each of said nodes to detect a failure of an adjacent node;
node reset means for allowing said each of said nodes to reset an adjacent node; and
request means for allowing said each of said nodes to request of said librarian to send a selected one of said sets of initialization codes to an adjacent node subsequent to said each node having detected a failure of said adjacent node.

23. A method of routing a packet of information, said packet being resident within a memory of a node of a distributed computing network, said method comprising the steps of:
   (a) comparing a value characteristic of the node to a value contained within the packet;
   (b) determining if the packet is to be routed to an other node;
   (c) consulting a router table, if the packet is determined in step (b) to be routed to the other node, to find a value characteristic of a list to which to append said packet, the router table being configured to associate nodes of the distributed computing network with lists of packets;
   (d) appending the packet to the list;
   (e) determining whether a task has been deactivated as a result of there previously having been no packets on the list; and
   (f) re-activating said task when the packet is appended to the list.

24. The method of claim 23 comprising the steps of:
validating, on the basis of address values contained within the packet and list values contained within the memory, that the packet is to be appended to a selected list if the packet is not to be routed to the other node; and
appending the packet to the selected list.

25. The method of claim 24 wherein said validating step comprises the steps of:
comparing an address value contained within a list header associated with the selected list with a predetermined value to determine whether the selected list is a valid list; and comparing an identification value contained within the packet with a corresponding identification value contained within the list header to determine whether the packet identifies the selected list.

26. The method of claim 25, comprising the step of appending the packet to a predetermined list if the selected list is not a valid list or if the packet does not identify the selected list.

27. A method of transmitting a packet of information, said packet resident at a location having an address within a memory of a node of a distributed computing network, said node having an output port, said method comprising the steps of:
   (a) obtaining a value indicative of an address from a packet list header, said packet list header including a pointer to said address;
   (b) reading the packet from the memory after having obtained the value indicative of said address;
   (c) operating said output port to effect transmission of said packet;
   (d) detecting a transmission error during said operating step (c); and
   (e) generating and transmitting an idle packet from said output port if no error is detected during said detecting step (d) and said packet list header indicates that there are no other packets to be transmitted.

28. The method of claim 27 wherein said detecting step comprises the steps of:
determining, in advance of said operating step, an allowable interval of time for transmitting the packet; and
indicating a transmission error if said operating step exceeds said interval.

29. The method of claim 28 wherein said allowable interval of time is determined on the basis of the length of the packet.

30. The method of claim 27, comprising the steps of:
determining whether said packet contains initialization code for an other node of the network; and
operating a reset means for resetting the other node prior to said operating step.

31. A method of transmitting packets of information from an output port of a node of a distributed computing network, said node connected to an adjacent node by a communication link, the method comprising the steps of:
   (a) determining whether there are any packets on a list of packets to be transmitted;
   (b) constructing an idle packet for determining the status of the link if there are no packets on the list to be transmitted;
   (c) operating the output port to effect transmission of said idle packet to an adjacent node;
   (d) obtaining a packet from said list if it was determined in step (a) that there is at least one packet on said list;
   (e) determining, on the basis of values contained within the packet obtained in step (d), whether the packet is a boot packet containing initialization instructions for the adjacent node;
   (f) operating the output port to effect transmission of the obtained packet if it was determined in step (e) that the packet is not a boot packet;
   (g) operating a reset line to the adjacent node if it was determined in step (e) that the packet is a boot packet; and
   (h) downloading said initialization instructions to the adjacent node subsequent to step (g).

32. The method of claim 31 further comprising the steps of:

determining the length of the packet to be transmitted to the adjacent node, comparing the time required for transmitting the packet to the determined time for transmitting the packet, and signalling a failure of said link if the time required for transmitting the packet exceeds the determined time.

33. A method of receiving a packet of information into a data port of a first node of a distributed computing network from an adjacent node, said method comprising the steps of:

(a) monitoring the data port;

(b) determining that the packet of information is being sent to the first node from the adjacent node;

(c) storing the packet of information into the memory of the first node;

(d) determining whether a packet transmission means for transmitting packets of information from the port is operating in a condition indicative of a failure of the adjacent node; and (e) signalling the packet transmission means with a signal indicative of the absence of a failure of the adjacent node if said packet transmission means is operating in a condition indicative of a failure of the adjacent node.

34. A method of receiving a packet of information into a data port of a first node of a distributed computing network from an adjacent node, said method comprising the steps of:

(a) monitoring the data port;

(b) determining that the packet of information is being sent to the first node from the adjacent node;

(c) determining whether the packet is an idle packet sent by said adjacent node for determining the status of the data port;

(d) storing the packet of information into the memory of the first node;

(e) determining whether a packet transmission means for transmitting packets of information from the port is operating in a condition indicative of a failure of the adjacent node; and (f) signalling the packet transmission means with a signal indicative of the absence of a failure of the adjacent node if said packet transmission means is operating in a condition indicative of a failure of the adjacent node.

35. The method of claim 34 further comprising the step of discarding the packet if it is an idle packet.

36. A method of receiving a packet of information into a data port of a first node of a distributed computing network from an adjacent node, said method comprising the steps of:

(a) monitoring the data port;

(b) determining that the packet of information is being sent to the first node from the adjacent node;

(c) storing the packet of information into the memory of the first node;

(d) determining whether a packet transmission means for transmitting packets of information from the port is operating in a condition indicative of a failure of the adjacent node;

(e) signalling the packet transmission means with a signal indicative of the absence of a failure of the adjacent node if said packet transmission means is operating in a condition indicative of a failure of the adjacent node; and (f) causing the packet to be routed toward a destination.

* * * * *